(12) United States Patent
Stevens et al.

(10) Patent No.: US 9,100,315 B2
(45) Date of Patent: Aug. 4, 2015

(54) SOURCE ASYNCHRONOUS SIGNALING

(71) Applicant: Granite Mountain Technologies, Salt Lake City, UT (US)

(72) Inventors: Kenneth Scott Stevens, Salt Lake City, UT (US); Shomit Das, Salt Lake City, UT (US)

(73) Assignee: GRANITE MOUNTAIN TECHNOLOGIES, Salt Lake City, UT (US)

( * ) Notice: Subject to any disclaimer, the term of this patent is extended or adjusted under 35 U.S.C. 154(b) by 185 days.

(21) Appl. No.: 13/829,243

(22) Filed: Mar. 14, 2013

(65) Prior Publication Data

US 2014/0064096 A1   Mar. 6, 2014

Related U.S. Application Data

(60) Provisional application No. 61/696,774, filed on Sep. 4, 2012.

(51) Int. Cl.
*H04L 12/801* (2013.01)
*H04L 1/16* (2006.01)

(52) U.S. Cl.
CPC .............. *H04L 47/12* (2013.01); *H04L 1/1621* (2013.01)

(58) Field of Classification Search
None
See application file for complete search history.

(56) References Cited

U.S. PATENT DOCUMENTS

| 7,417,993 | B1 | 8/2008 | Ebergen et al. | |
| 2006/0050708 | A1* | 3/2006 | Shapiro et al. | 370/394 |
| 2007/0245201 | A1* | 10/2007 | Sammour et al. | 714/748 |

OTHER PUBLICATIONS

Teehan, et al.; "Estimating Reliability and Throughput of Source-Synchronous Wave-pipelined Interconnect"; IEEE 2009.
Tran, et al.; "A Reconfigurable Source-Synchronous On-Chip Network for GALS Many-Core Platforms"; IEEE 2010.
Stevens, et al.; "Energy and Performance Models for Synchronous and Asynchronous Communication"; IEEE 2010.
Stevens; "Energy and Performance Models for Clocked and Asynchronous Communication"; Proceedings of the Ninth International Symposium on Asynchronous Circuits and Systems; 2003.
Peeters; "Single-Rail Handshake Circuits"; Copyright 1996.
Peeters, et al.; "Single-Rail Handshake Circuits"; IEEE 1995.
Ho, et al.; "Long wires and asynchronous control"; IEEE 2004; Proceedings of the 10th International Symposium on Asynchronous Circuits and Systems.
Joshi et al.; "Design and Optimization of On-Chip Interconnects Using Wave-Pipelined Multiplexed Routing"; IEEE 2007.
Mandal, et al.; "A Fast, Source-synchronous Ring-based Network-on-Chip Design"; EDAA 2012.
Brunvand; "Low Latency Self-Timed Flow-Through FIFOs", IEEE 1995.
Bainbridge, et al.; "Delay-Insensitive, Point-to-Point Interconnect using m-of-n Codes"; Proceedings of the Ninth International Symposium on Asynchronous Circuits and Systems; 2003.
Ho, et al; "The Future of Wires"; IEEE 2001, vol. 89. No. 4 Apr. 2003.
Han, et al.; "Clocked and Asynchronous FIFO Characterization and Comparison"; 17$^{th}$ International Conference; IFIP/IEEE, Oct. 2009.

* cited by examiner

*Primary Examiner* — Kerri Rose

(74) *Attorney, Agent, or Firm* — Michael Best & Friedrich LLP

(57) ABSTRACT

Technology for asynchronous communication including a wired channel, a sender controller, and a receiver controller is disclosed. The sender controller can be configured to send multiple request signals up to a predefined limit on the output request port paired with multiple data blocks sent on the data before receiving an acknowledgment signal on the output acknowledge port. At least one combination of any of the input channel, the sender controller, the output channel, and the receiver controller can be configured to operate within at least one time constraint to avoid stalling an asynchronous flow control.

29 Claims, 13 Drawing Sheets

SOURCE ASYNCHRONOUS SIGNALING

RELATED APPLICATIONS

This application claims the benefit of and hereby incorporates by reference U.S. Provisional Patent Application Ser. No. 61/696774, filed Sep. 4, 2012.

BACKGROUND

Latency down a wired communication link on an integrated circuit is dependent upon the resistance, capacitance, and current carrying capabilities of the wires within the communication link. Each new process generation of integrated circuit technology scales the technology down by reducing the cross sections of the wires while simultaneously placing them closer together. This increases the number of communication links in a fixed millimeter squared area of an integrated circuit. However, the reduction of the cross sections of the wires in close proximity to each other also modifies the signal carrying properties of the wire.

In a scaled wire, capacitance remains substantially the same but resistance substantially increases due to the reduced cross sectional area. The increased resistance produces a relative increase in the communication latency down a fixed length of wire, such as a 500 micro-meter interconnect. To put this in perspective, assume that every two years a new process generation is created with a scaling factor of 0.7, and that the aspect ratios of wires remain constant. Thus the cross sectional area of wires for each new generation is $(0.7)^2=0.5$, or half that of the previous generation, resulting in a doubling of the wire resistance.

Since wire delay can be approximated as the product of resistance and capacitance (RC), the delay down the same length of wire can double each process generation. In 10 years, 5 process generations have occurred and wire delay down the same distance of interconnect on a scaled wire increases 32 fold ($2^5$). Using this assumption, in the last 40 years that the current silicon process technology has been scaled, wire latency would be over a million times greater now than wire latency was in 1972 (assuming no other changes occurred). Various methods have been employed to mitigate reduced wire performance such as better dielectrics, less resistive wire materials, and different aspect ratios. Yet even given the reduced impact from technological innovation to reduce scaling impact on wires, designs built using modern process technologies can have significant limitations due to wire latency.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
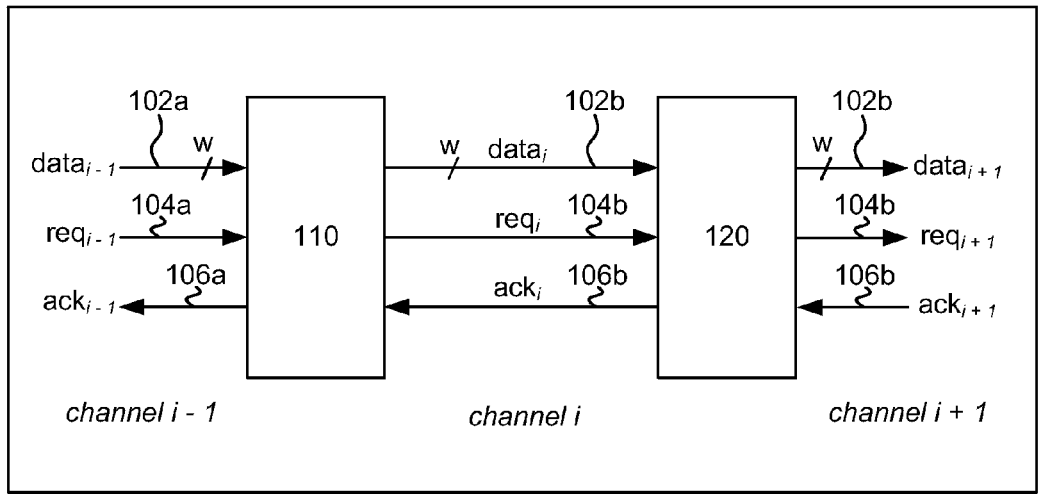
FIG. 1 illustrates a communication channel with pipeline controller elements that allow the communication channel to communicate with other elements in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed.

The exact allowable degree of deviation from absolute completeness may in some cases depend on the specific context. However, generally speaking, the nearness of completion can be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "set" refers to a collection of elements, which can include any natural number of elements, including one, zero, or higher integer values.

As used herein, the terms "sender/receiver controller," "sender/receiver control element," "sender/receiver element," "pipeline controller elements," "logic elements," "pipeline buffers," "channel control element," "communication channel control element," "asynchronous channel control element," "traditional linear pipeline controllers," "receiver control interface," "set of control elements," "asynchronous linear handshake controllers," "linear pipeline control elements," "sender logic," "receiver logic," "control logic," "SAS handshake control element," "SAS control element," "SAS sender element," "SAS receiver element," and the like can be used interchangeably throughout this application, unless otherwise indicated. Where "SAS" appears in the term, the term can be applied to examples involving a SAS protocol, however, any of the foregoing terms can also involve implementation of a SAS protocol. Any function, denotation, or connotation associated with any one such term is attributed to all other such terms by a person of ordinary skill in the art. The terms "sender element" and "receiver element" also carry the same meanings provided by the aforementioned terms and meanings provided by terms like sender logic and receiver logic.

As used herein, the terms "wired channel," "wired, asynchronous communication channel," "SAS channel," "wired, SAS channel," "handshake channel," "pipeline," "single communication channel," and the like can be used interchangeably throughout this application, unless otherwise indicated. Where "SAS" appears in the term, the term can be applied to examples involving a SAS protocol, however, any of the foregoing terms can also involve implementation of a SAS protocol.

As used herein, the terms, "predefined limit," "limiting number," "predetermined limit," and the like can be used interchangeably throughout this application, unless otherwise indicated.

As used herein, the terms, "request," "req," "request signal," "request operation," "request transaction," and the like can be used interchangeably throughout this application, unless otherwise indicated.

As used herein, the terms, "acknowledgment," "ack" "acknowledgment signal," and "acknowledgment operation," "acknowledgment transaction," and the like can be used interchangeably throughout this application, unless otherwise indicated.

As used herein, the terms, "sender FIFO logic," "linear FIFO element," "n-deep FIFO element," "asynchronous control FIFO element," "FIFO logic" and the like can be used interchangeably throughout this application, unless otherwise indicated.

As used herein, the terms, "receiver FIFO logic," "linear data FIFO element," "n-deep FIFO control-flow element," " asynchronous control FIFO element," "FIFO logic" and the like can be used interchangeably throughout this application, unless otherwise indicated.

As used herein, the terms "request," "req," "timing reference," "data validity reference," or the like, can be used interchangeably throughout this application, unless otherwise indicated. Any function, denotation, or connotation associated with any one such term is attributed to all other such terms by a person of ordinary skill in the art. By way of example and not limitation, an instance of the term "request" or "req." can refer to the functions of: (i) a request for an acknowledgement of data reception; (ii) performing a timing reference; (iii) and/or indicating validity of a block of data.

As used herein, the term "data block" refers to a set of data and can be used interchangeably with the term "data token."

Other terms may be defined elsewhere in the body of this specification.

EXAMPLES OF THE INVENTION

An initial overview of technology improvements is provided below and then specific technology examples are described in further detail later. This initial summary is intended to aid readers in understanding the technology more quickly, but is not intended to identify key features or essential features of the technology, nor is it intended to limit the scope of the claimed subject matter.

Communication employing asynchronous handshake protocols can be accomplished by sending data accompanied by a timing reference or data validity information, which can be embodied in a acknowledgment signal indicating reception of data, down a communication link. Flow control can be established by acknowledging the receipt of the data, thereby enabling the transmission of new data down the link. The handshake signals, which can comprise request and acknowledgment handshake signaling, can be generated using pipelined control logic that implements the protocol. The frequency of communication is determined by the latency of the control logic plus the latency down the communication wires. Thus maximum operating frequency can be established when the pipelined controllers are physically adjacent to each other, as in a First-In First-Out (FIFO) element. Increasing distance between pipeline stages can increase wire delay, and can decrease the operating frequency of the system. A wire can refer to any medium that can conduct electricity. For example, a wire can include a metal (e.g., silver, gold, or aluminum), polysilicon, or other conductive material. A FIFO element can include a parallel FIFO, a tree FIFO, or a non-linear FIFO.

The direct consequence of wire latency can easily be observed when employing asynchronous request acknowledge handshake based communication. Every additional picosecond of wire delay, due to controllers being placed farther apart, directly results in at least two picoseconds of degradation in the cycle time (e.g., 1 ps for request latency, one for acknowledge latency). As the communication distance between control elements increases, the communication overhead increases, with a commensurate decrease in operating frequency and communication bandwidth. At some wire length, the communication delay eventually exceeds the desired performance target.

A protocol called Source Asynchronous Signaling (SAS) can provide for asynchronous handshake based communication. The SAS communication protocol can decouple the request and acknowledge handshaking signals in such a way that multiple request operations can occur without an acknowledgment operation, and multiple acknowledgment operations can occur without an intervening request operation. Additionally, details for implementing SAS for asynchronous handshake communication follow.

The SAS protocol can enable full bandwidth communication when wire delays are sufficiently large that wire delays can limit the bandwidth below the desired frequency when employing the traditional handshake communication channel protocols. In an example, the request handshake operation can become decoupled from the acknowledgment handshake operation. This decoupling can allow the request operation to proceed at the desired frequency to meet bandwidth demands. The number of request operations can be greater than or equal to the number of acknowledgment operations on a communication channel.

In an example, details for designing an integrated circuit that controls a wired channel operating with the SAS protocol are provided. FIG. 1 illustrates a generalized handshake channel, which can be used to illustrate the SAS protocol. The generalized handshake channel can comprise a sender element 110, a communication channel that contains data 102*b* and (possibly encoded) handshaking signals 104*b* and 106*b*, and a receiver element 120. In some examples, the sender element and the receiver element can be implemented with First Input, First Output (FIFO) logic. The FIFO logic can have depths equal to a predefined limit up to which request signals can be sent without an intervening acknowledgment signal and/or up to which acknowledgment signals can be sent without an intervening request signal. Non-limiting examples of timing conditions/constraints and other constraints necessary for correct implementation of such designs are provided.

Non-limiting examples of such timing constraints can include a requirement that an input channel providing data to the wired, SAS channel operate at a minimum cycle time that is greater than or equal to a minimum output cycle time (i.e., a maximum input frequency can be less than or equal to a maximum output frequency). In some examples, a maximum cycle time for sender FIFO logic and/or receiver FIFO logic can be less than the minimum output cycle time (i.e., a minimum frequency of the FIFOs can be greater than the maximum output frequency). A time to fill the sender FIFO logic, for some examples, can be greater than and/or equal to a response time of the wired, SAS channel. Also, in certain examples, the depth of the sender FIFO logic can be less than or equal to the depth of the receiver FIFO.

Figure 2:
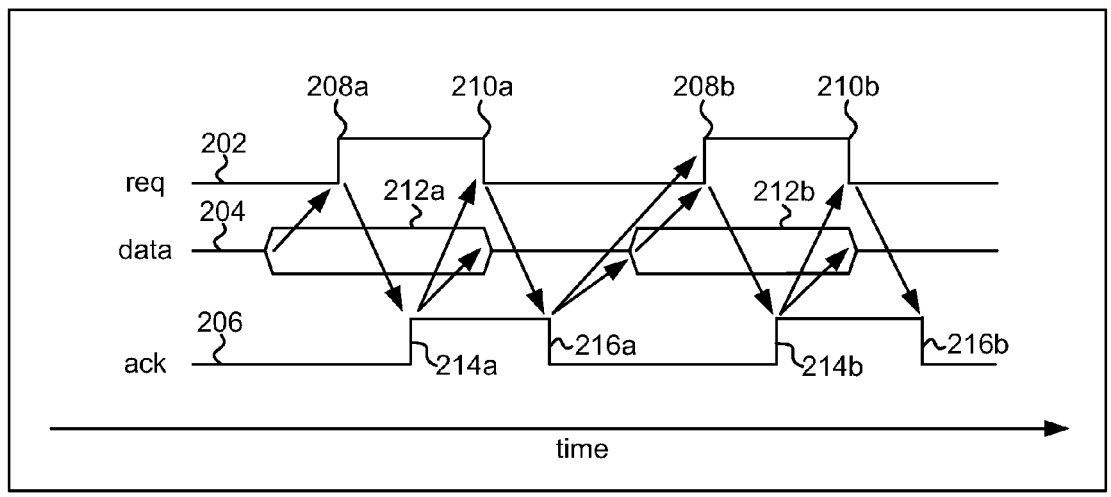
FIG. 2 illustrates dependencies for a four-phase "Return-to-Zero" (RZ) bundled data handshake protocol where data is valid and stored on the rising edge of the request in accordance with an example.
Figure 3:
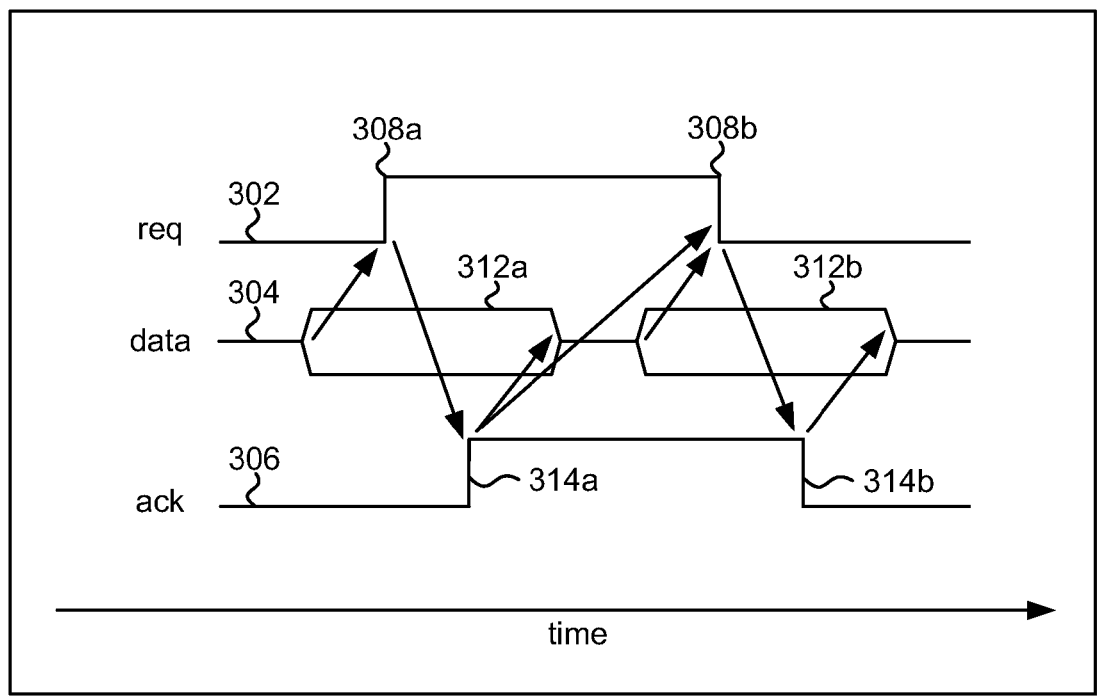
FIG. 3 illustrates dependencies for a two-phase "Non-Return-to-Zero" (NRZ) bundled data handshake protocol in accordance with an example.

Referring back to FIG. 1, an example of a bundled data asynchronous handshake communication channel is shown. Asynchronous communication channels can have three aspects: (i) the communication channel control elements 110, 120; (ii) the data encoding (not depicted) employed by the communication channel control elements; and the (iii) handshake protocol (non-limiting example handshake protocols are depicted in FIG. 2 and FIG. 3) implemented by the communication channel control elements. Asynchronous communication channel control elements 110 and 120 can consist of traditional linear pipeline controllers for a traditional asynchronous handshake communication channel. These controllers can interface between pipeline stages, or communication channels.

In the example, the first controller 110 can take input in the form of data blocks and asynchronous control flow signaling from an input channel, channel i–1. The input can be communicated over an input set of data wires 102*a*, input request wiring 104*a* for request handshake signaling, and input acknowledge wiring 106*a* for acknowledge handshake signaling from the first controller at a receiver end of a wired channel, channel i–1. Channel i can comprise a set of data wires 102*b* to transmit data and request wiring 104*b* and acknowledgment wiring 106*b* for asynchronous flow control. Likewise, the second controller 120 can accept data from channel i at a receiver end and can output data onto channel i+1. Channel i+1 can also comprise an output set of data wires 102*c*, output request wiring 104*c*, and output acknowledgment wiring 106*c*. The channel controllers 110, 120 can be designed to implement the data encoding that is present on the relevant channels as well as control data sequencing and the concurrency, as dictated by the communication protocol(s) between channels.

In this example, the data encoding can employ a traditional binary encoded data channel where each wire encodes either a one or a zero value. However, additional data coding approaches known to those of ordinary skill in the art are possible. The data validity and timing reference for the data, which can be transmitted in units of data blocks and/or data tokens, can be passed as an explicit signal on the wires labeled "req." This data encoding is often called a "bundled data" encoding and uses w+1 wires to encode w bits of data. The acknowledge handshake can be implemented as a communication wire labeled "ack" in FIG. 1.

A third aspect of the handshake communication channel can be the channel protocol. The channel protocol generally can, but need not necessarily, include of two aspects. These two aspects can comprise: (a) the concurrency that is implemented between input and output channels of the controllers 110 and 120 and (b) the relationship between the data validity information (in this example, the request signal) and the data information. Any protocol concurrency or data validity relationship as known by those skilled in the art can be implemented in a communication channel consistent with examples.

Relationships can be employed as known by those skilled in the art between data validity information and data information using bundled data communication channel elements. In the following examples, two protocols are demonstrated, a "four-phase," or "Return-to-Zero" (RZ), protocol in FIG. 2, and a "two-phase," or "Non-Return-to-Zero" (NRZ) protocol in FIG. 3. Each of these figures shows two complete handshake cycles with corresponding data transfers. In a bundled data encoding, data validity information can be encoded by one or more transitions on a req wire, as in FIG. 2 and FIG. 3. Acknowledgment information can be encoded by transitions on an ack wire.

FIG. 2 illustrates data transmissions and supporting asynchronous control-flow signaling over a wired communication channel, which can be, but need not be, similar to channel i, as depicted in FIG. 1, consistent with a four-phase, RZ, protocol. In a four-phase protocol, two transitions can occur on wiring caring data validity information and two transitions can occur on wiring caring acknowledgment information per data transfer. Both request and acknowledgment control signals, on their respective wiring, can return to the idle (usually zero or low voltage) value at the end of the operation. This results in four control transitions per complete channel handshake transaction.

For example, three waveforms 202-206 are illustrated in FIG. 2 for purposes of explaining example RZ protocols. A request (req) waveform 202 depicts request handshake signaling. The req waveform can be transmitted over request wiring 104*b*, comprising one or more wires, similar to the wiring depicted in FIG. 1. Along the req waveform, a first req transition 208*a* from low to high voltage can occur, followed by a second req transition 210*a* from high to low to complete a RZ channel handshake transaction (other transition patterns, such as from high to low and then from low to high, are also possible). A third req transition 208*b* and a fourth req transition 210b pertain to a second complete RZ channel handshake transaction, or data transfer.

A data waveform 204 depicts the transmission of a first data block 212a and a second data block 212b. The data wave waveform can be transmitted over a set of data wires 102b similar to those depicted in FIG. 1 and can comprise any data encoding known to those of ordinary skill in the art, such as binary transitions between low and high voltages. An acknowledgment (ack) waveform 206 depicts acknowledgment handshake signaling for example RZ protocols, which can be transmitted on acknowledge wiring 106b similar to that depicted in FIG. 1. As with the req waveform 202, the ack waveform has a first transition 214a from low to high voltage followed by a second transition 216a from high to low to a first complete RZ channel handshake transaction (other transition patterns, as discussed above, are also possible). A third transition 214b and a fourth transition 216b pertain to a second data transfer 212b.

Therefore, a communication channel, such as channel i, can start in an idle state with the req and ack signals, respectively carried within the req waveform 202 and the ack waveform 206, both at, for example, a zero binary logic level on request wiring 104b and acknowledge wiring 106b, while the binary data signals on the set of data wires 102b can contain one or more arbitrary values. Dependencies between the three waveforms/signals for such an example are depicted with arrows. In the example, a block of binary data 212a from the linear pipeline controller 110 can be driven onto, or asserted on, the set of data wires of channel i at one or more values to be transmitted down the communication channel.

Sometime later (represented by the first arrow from left to right) the first linear pipeline controller 110 can assert a req signal over the request wire 102b with the first transition 208a within the req waveform 202. The first transition can indicate that the first data block 212a is valid on the channel. (In alternative embodiments, the first data block can be valid before a second edge 210a on the req signal.) The data and req signals can propagate down the channel and arrive at the receiver end of the channel at the second linear pipeline controller 120. In examples with a bundled data protocol, the data block first arrives at the second controller. When the first req transition 208a later arrives, the first req transition can indicate that the second controller can store the data block, as indicated by the first arrow, and, as indicated by the second arrow, acknowledge a receipt on the channel by asserting ack on the acknowledge wiring 106b with the first ack transition 214a within the ack waveform 206.

When the ack signal propagates down the acknowledge wiring 106b to the first controller 110, the first pipeline controller can lower req signaling with the second req transition 210a, as indicated by the third arrow. The fourth arrow indicates that the first controller can unassert data upon receipt of the first ack transition 214a. Upon receipt of the second req transition to a low, or alternatively high, state, the second linear controller 120 can then lower ack signaling with the second ack transition 216a within the ack waveform 206, as indicated by the fifth arrow, and the first data transfer can be complete.

As can be appreciated, transmission of the first data block 212a results in four transitions on the control wires (two each on request wiring and acknowledge wiring) in the four-phase RZ protocol. Once transmission of the first data block is signaled to the second control element 120 by the second ack transition 216a, as indicated by the sixth and seventh arrows, a second data block 212b can be driven onto the set of data wires 102b together with a third req transition 208b on the request wiring 104b. The third req transition can indicate validity of the second data block, among other potential functions. A third ack transition 214b and a fourth ack transition 216b, within the ack waveform 206, and a fourth req transition 210b, within the req waveform 202, provide control signaling to complete the second data transfer 212b. Any other valid, four-phase protocol known by those skilled in the art can also be employed.

FIG. 3 illustrates data transmissions and supporting control signaling over a wired communication channel consistent with a two-phase, NRZ, protocol. A two-phase protocol is similar to a four-phase protocol except that the control wires are not returned to the idle state after data transmission. This results in two transitions down a communication channel (one each on request wiring and acknowledge wiring) for each data transmission. The RZ and NRZ protocols discussed herein are not intended to be limiting, and any other relationship as known by those skilled in the art that encodes data validity and data values may be employed in a channel communication.

For purposes of explaining two-phase, NRZ protocols, three waveforms 302, 304, and 306 are depicted in FIG. 3. A req waveform 302 depicts request handshake signaling for example NRZ protocols, which can be transmitted over request wiring 104b similar to that depicted in FIG. 1. A data waveform 304 depicts the transmission of a first data block 312a and a second data block 312b, potentially over the set of data wires 102b. Also, an ack waveform 306 depicts acknowledgment handshake signaling, which can be transmitted on acknowledge wiring 106b similar to that depicted in FIG. 1.

Arrows depicted in FIG. 3 between transitions within the waveforms/signals can indicate dependencies between transitions within the various waveforms/signals. Before transmission of data, control signaling on the request wiring 104b and the acknowledge wiring 106b can be at an idle (usually zero or low voltage) value and the set of data wires 102b can have one or more arbitrary values. The first arrow, from left to right, can indicate that after the first data block 304 is driven, or asserted, on the set of data wires by a first control element 110, the first control element can also cause a first req transition 308a within the req waveform 302 from low to high voltage on the request wiring. The first req transition 308a can serve multiple functions, such as a request for acknowledgment of data reception and/or storage, an indication of validity for the first data block 312a on the first set of data wires, and/or providing a timing reference.

As indicated by the second arrow, once the first req transition 308a has been received by the second control element 120, the second control element can store the first data block 312a. The second control element can also cause the first ack transition 314a to be signaled within the ack waveform 306 by the acknowledge wiring 106b. After receiving the first ack transition, the first control element 110 can stop maintaining signaling for the first data block 312a so that a second data block 312b can be sent with an accompanying second req transition 308b, followed by a second ack transition 314b. Any other valid, two-phase, NRZ, protocol known by those skilled in the art can also be employed.

In the bundled data relationship shown in FIG. 2 and FIG. 3, a timing relationship holds for signal propagation between data and req signals. The assertion of a request handshake control signal can be delayed so that the skew between the data and req signal can guarantee that data arrives at the receiver end of the channel to a control and storage element at the second controller 120 with sufficient setup time before the req signal arrives. Variation can occur due to process variation, differences in signal routing on a chip resulting in different wire lengths, cross coupling between other wires, inductive currents induced on the wires, variation in the delay of the drivers/controllers for the different signal wires, or any other such variation.

Other data encodings may be used across a data channel. Each can have different delays and response times. Such codes can include, by way of illustration and not limitation, dual-rail codes, one-of-n codes, or any other method as known by those skilled in the art. The technologies provided here are valid for any encoding. More detailed examples depicting data storage elements and a control signaling consistent with FIG. 1 for bundled data communication are depicted in FIG. 4.

Figure 4:
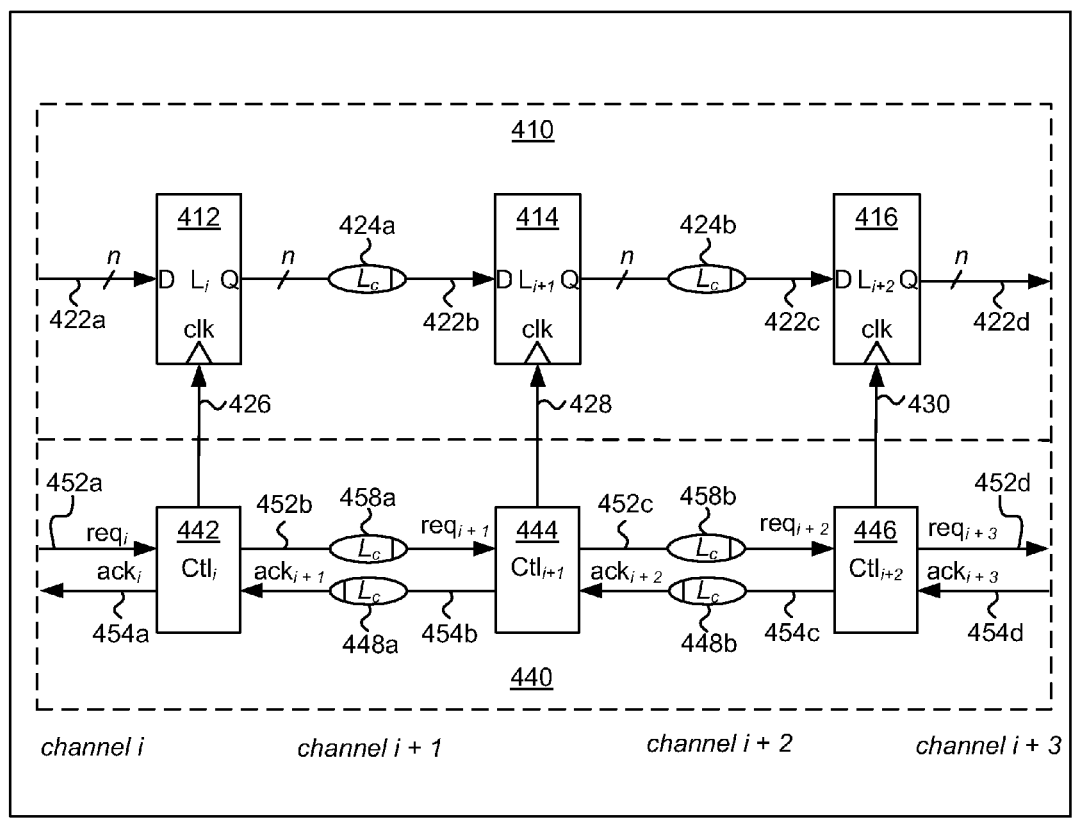
FIG. 4 illustrates a timed asynchronous pipeline implementing communication channels with elements for data storage and control flow in accordance with an example.

FIG. 4 illustrates aspects of circuitry facilitating interactions between control elements and data storage elements consistent with various examples of a pipelined asynchronous communication channel. FIG. 4 illustrates three pipeline stages, rather than two. FIG. 4 also separates out a data path 410 and a control path 440. The data path comprises separate pipeline storage elements 412, 414 and 416. Similarly, the control path has separate linear pipeline control elements 442, 444 and 446, which control the storage of data in the storage elements by implementing handshaking control between channels.

In FIG. 4, the first storage element 412 (e.g., latch, such as data or delay flip-flop (D flip-flop)) can be configured with a data input, "D," in communication with an input set of n data wires 422a. One or more data values, which can make up a data block or data token, on the first set of n data wires can be stored or not stored in the first storage element depending on signaling values, transitions, and/or edges at a clock input "clk." (The input need not be a clock input.) The first storage element can also comprise a data output, "Q," communicatively coupled to a second set of n data wires 422b. Any data values stored in the first storage element can be placed, or not placed, on the second set of n data wires for propagation to the second storage element 414, depending on the values and/or edges at the clock input. Additionally, the first control element can have latch and/or pipeline index "Li" associated with storing data and outputting that data. The "L" can include a latch, a flip-flop, or any other storage element known by those skilled in the art. Lc can represent a latency of a channel.

Similarly, the second storage element 414 has a data input, "D," in communication with the second set of n data wires 422b and a data output, "Q," coupled to a third set of n data wires 422c performing similar functions under the control of values, transitions, and/or edges at a clock, "clk," or some other input.

The second storage element also has a pipeline index "Li+1." The third set of n data wires 422c is also coupled to a data input "D" at a third storage element 416. The third storage element also has a data output "Q" in connection with a fourth set of data wires 422d. A pipeline index "Li+2" is also associated with the third control element, whose functions are also under the control of a clock, "clk," or some other input.

A first channel latency time, Lc, 424a obtains for the propagation of data down the second set of data wires 422b between the first storage element 412 and the second storage element 414. Similarly, a second channel latency time, Lc, 424b obtains for the propagation of data down the third set of data wires 422c between the second control element and the third control element 416. The first and second channel latency times can be the same or different.

The control path 440 can be communicatively coupled to the data path by communication wires coupling pairs of storage elements. For example, the first control element 442 can drive the first storage element 412 by a first wiring 426 from the first control element and communicatively coupled to the clock, clk," or other input, of the first storage element 412. Similarly, the second control element 444 can drive the second storage element 414 with a communicatively coupled second wiring 428. The third control element 446 can also drive the third storage element 416 over a communicatively coupled third wiring 430.

The first control element 442 has a corresponding ConTroLer plus the pipeline index, "CtlL$_i$," arising from implementation times for logic performing request and acknowledgment signaling. The first control element can receive requests, such as req$_i$, from a previous stage over an input request wiring 452a and send acknowledgments, such as ack$_i$, over an input acknowledge wiring 454a. Also, the first control element can send requests, such as req$_{i+1}$, to the second control element 444 over a second request wiring 452b, with corresponding channel latency, Lc, 458a. The first control element can receive acknowledgments, such as ack$_{i+1}$, over a second acknowledge wiring 454b, with corresponding channel latency, Lc, 448a.

Similarly, the second control element 444 has a corresponding ConTroLer plus the pipeline index, "CtlL$_{i+1}$," and can receive requests, such as req$_{i+1}$, over the second request wiring 452b, and can send acknowledgments over the second acknowledge wiring 454b. A latency can occur with logic blocks, such as the control elements. The second control element can send requests, such as req$_{i+2}$, over a third request wiring 452c, with corresponding channel latency, Lc, 458b, and receive acknowledgments, such as ack$_{i+2}$, over a third acknowledge wiring 454c, with corresponding channel latency, Lc, 448b. The third control element 446 has a corresponding ConTroLer plus the pipeline index, "CtlL$_{i+2}$," and can receive requests and send acknowledgments over the same wiring. The third control element can send requests, such as req$_{i+3}$, over output request wiring 452d and receive acknowledgments, such as ack$_{i+3}$, over output acknowledge wiring 454d.

Any handshake protocol known to those of ordinary skill in the art can be employed on the control channel 440. As stated, latency across the channels can be represented as Lc. Each of the signals: data, request, and acknowledge, can exhibit a delay of Lc, which can differ or be shared in common. For communication links, the wires can exhibit substantial latency, Lc. Latches can be, but need not necessarily be, used rather than flip-flops for storage. Any method as known by those skilled in the art to make asynchronous bundled data communication pipelines may be employed.

Figure 5:
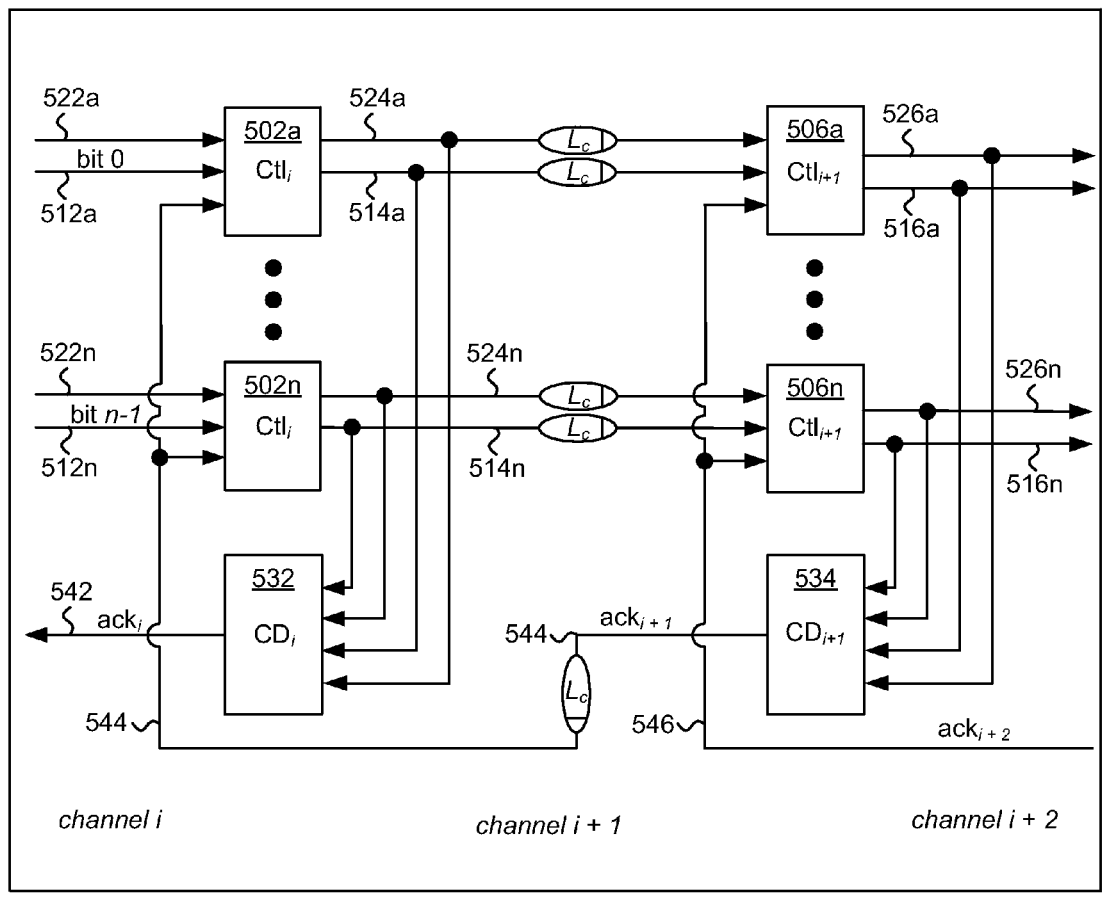
FIG. 5 illustrates a timed, delay-insensitive asynchronous pipeline implementing communication channels in accordance with an example.

FIG. 5 illustrates aspects of circuitry facilitating implementation of a delay insensitive code, which can be consistent with FIG. 1 and various examples of technologies presented herein. A first set of control elements 502a through 502n, as well as a second set of control elements 506a through 506n, can store and forward data encoded with delay-insensitive codes between communication channels. The encoding and concurrency between the channels can implement any method as known by those skilled in the art. An acknowledgment signal can be generated from a unit of completion detection logic 532 and 534. The delay down the communication channel can be substantially similar for all the wires, and can be represented with the variable value $L_c$ on communication wires in channel$_{i+1}$. Since certain wired connections can have delay times shorter than $L_c$, these delay times can be of lesser importance in characterizing a channel such as channel$_{i+1}$ and are not labeled.

In examples consistent with FIG. 5, a pipelined asynchronous handshake communication channel can be implemented with a dual-rail encoding of data and validity signals. In such examples, 2w signals can encode w bits of data and data validity information. Two wires 512a and 522a can encode a single data bit. As depicted, a set of n data bits can be encoded with n data wires 512a-512n and a second set of n data wires 522a-522n. Other encodings that have more wire and encode more bits may be used as known by those skilled in the art.

The input set of request wires 512a-512n and 522a-522n can initially encode an idle, or potentially a NULL code, and then transition to a code indicating data is valid, such as with a binary value of either zero or one. Upon receiving a request indicative of valid data, the first set of control elements 502a-502n, can store data from the input set of data wires 512a-512n and 522a-522n and/or pass that data onto a second set of data wires 514a-514n and 524a-524n. The first set of control elements can send a request on a second set of request wires 514a-514n and 524a-524n by transitioning to a valid code and can, previously, concurrently, or after, place the stored data on a second set of data wires 514a-514n and 524a-524n.

As depicted, the second set of data wires and request wires 514a-514n and 524a-524n can be communicatively coupled to a first completion detection logic 532. The first completion detection logic can detect when all, or a sufficient number, of the second set of data wires and request wires 514a-514n and 524a-524n have been transitioned to signal a request and/or data from the input set of data wires and request wires 512a-512n and 522a-522n. When the appropriate conditions are met on these wires, the first completion detection logic can send an acknowledgment, such as $ack_i$, on input acknowledge wiring 542 to a previous stage.

Similarly, the second set of control elements 506a-506n can receive a request signaling of the second set of data wires and request wires 524a-524n and 514a-514n. The second set of control elements can also pass data through to an output set of data wires and request wires 516a-516n and 526a-526n indicating valid data. Once a request has been signaled on the third set of request wires and the accompanying data has been placed on the third set of data wires, a second completion detection logic 534 can send an acknowledgment, such as $ack_{i+1}$, on a second acknowledge wiring 544. Since sending of the acknowledgment depends on statuses and not time, the code can be substantially delay insensitive.

The second acknowledge wiring 544 can provide the acknowledgment to the first set of control elements 502a-502n. Upon receiving an acknowledgment, the first set of control elements can return the dual rail code for each bit to the idle or NULL state. The first completion detection logic 532 can detect the return to idle and can lower the acknowledgment signal on the first acknowledgment wire 544. Similar actions can be performed by the second set of control elements 506a-506n, which can receive an acknowledgment, such as $ack_{i+2}$, over an output acknowledge wiring 546 from another stage. The second completion detection logic 532 can also perform similar actions. Under such an example, the data encoding of the communication channel can employ a four-phase RZ handshake protocol as shown in FIG. 2. Other protocols, such as the Level-Encoded Dual Rail (LEDR) protocol, can be employed with data encoding to implement a two-phase NRZ handshake protocol.

An asynchronous communication channel may use any data encoding known to those skilled in the art such as, by way of example and not limitation, bundled data, dual-rail, m-of-n, LEDR, single track, and similar data encoding. As additional non-limiting examples, the asynchronous communication channel may also employ any of the data encodings known to those skilled in the art, such as four-phase or two-phase. Additionally, the communication channel may be point-to-point, or employ branching by using forks, joins, or other methods of achieving multi-point communication as known to those skilled in the art.

The various aspects of asynchronous signaling provided in the discussion of the preceding figures provides a foundation for a discussion of the bandwidth of traditional asynchronous designs, which can begin with a comparison to clocked communication protocols. The maximum bandwidth of clocked communication can be expressed to the first order as follows, where the maximum bandwidth $B_{clk}$ is proportional to the width of the data path w divided by the maximum of the latency down the communication link $L_c$ plus the setup time SU, or the clock cycle time $C_{clk}$.

$$B_{clk}=w/\max(C_{clk}, L_c+SU) \quad (1)$$

Conversely, the maximum bandwidth of communication between asynchronous handshake controllers using traditional handshake protocols can be expressed in Equations (2) and (3).

$$B_2=w/(2\times L_c+C_{Or}), \quad (2)$$

$$B_4=w/(4\times L_c+C_{Or}). \quad (3)$$

Variable w is the width of the data-path in terms of the number of data bits carried by the data communication link, and cycle times are converted into frequencies by putting them in the denominator. $B_2$ is the maximum bandwidth of a two phase communication protocol. $B_2$ is proportional to the sum of $C_{Or}$, the req to ack response time of the respective output channel (452 to 454), plus twice $L_c$, the latency down the communication channel. The response time $C_{Or}$ can be a property of both the channel wire delays 448 and 458 and controller delays (e.g. 442, 444, and 446). The latency down the communication channel is doubled because in the two-phase protocol, as depicted in FIG. 3, there is one transition on the req handshake signal and one on the ack handshake signal.

Figure 6:
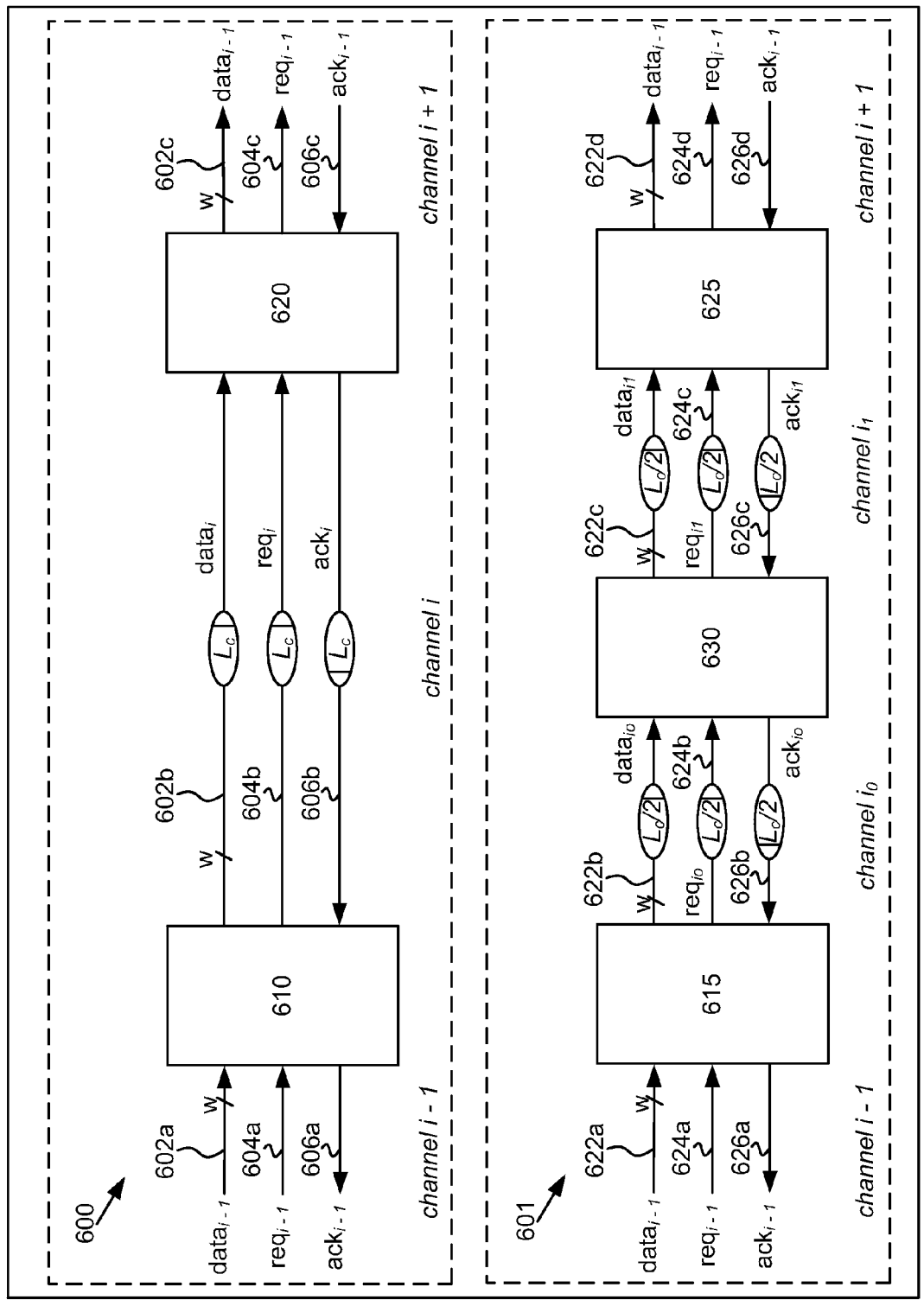
FIG. 6 illustrates a bundled data communication channel that is split into two communication channels by adding a pipeline stage in accordance with an example.

The maximum bandwidth of the four-phase protocol, as depicted in FIG. 2, is $B_4$, which is proportional to the cycle time of the pipeline controller $C_{pc}$ plus four times the channel latency $L_c$ due to the four transitions on the handshake control signals. As channel wire latency $L_c$ increases, the bandwidth decreases proportionally, either by two-fold for the two-phase protocol or four-fold for the four phase protocol. Thus the bandwidth in traditional handshake protocols is directly dependent on the latency down the channel due to the handshake protocol employed, as indicated by equations (2) and (3) for a two-phase protocol and a four-phase protocol respectively:

FIG. 6 illustrates a length over which communication can take place for a pair of pipelines 600, 601 illustrating an approach to improving bandwidth for asynchronous communications channels consistent with the preceding equations. Communication channels in a design can have bandwidth requirements in order to meet the performance targets of the design, which can result in a need to improve bandwidth. In the upper pipeline 600, bundled data handshake communication channel, can be disposed between $channel_{i-1}$ and $channel_{i+1}$.

Asynchronous linear handshake controllers 610 and 620 can be disposed at either end of $channel_i$. $Channel_{i-1}$ can comprise an input set of data wires 602a with w elements, input request wiring 604a, and input acknowledge wiring 606a. $Channel_i$ between asynchronous linear handshake controllers 610 and 620, can comprise a second set of data wires 602b with w elements, second request wiring 604b, and second acknowledge wiring 606b. Similarly, $channel_{i+1}$ can comprise an output set of data wires 602c with w elements, output request wiring 604c, and output acknowledge wiring 606c.

By way of example, the frequency of operation of the handshake channel can be assumed to be targeted at 1 GHz (1000 ps cycle time) and that the overhead time of the control logic $C_{pc}$ consumes 800 ps for a handshake cycle. This leaves 200 ps for communication overhead. Since the four-phase handshake protocol uses four sequential signal communications between the linear pipeline control elements 610 and 620, the wire latency $L_c$ can be 200 ps/4=50 ps and still meet a bandwidth requirements of the system.

However, the two-phase handshake protocol uses two sequential transitions between the two linear pipeline controllers 610 and 620. This allows the wire latency $L_c$ to double to 200 ps/2=100 ps and still meet the communication channel bandwidth requirements since according to the denominator of equation 2, 2×100 ps+800 ps=1000 ps when $L_c$=100 ps and $C_{pc}$=800 ps. Thus one common method known to those skilled in the art of gaining increased bandwidth in a system with substantial wire latencies $L_c$ is to employ two phase protocols rather than four phase protocols.

If the communication latency exceeds the bandwidth requirements other approaches are taken. Again assume the bundled data handshake communication channel shown in FIG. 6 between asynchronous linear handshake controllers 610 and 620 is employed with the same exemplary parameters of a 1 GHz frequency target and 800 ps control logic overhead $C_{pc}$. If the communication delay across the channel $L_c$=200 ps, then the maximum cycle time of the channel using a two-phase protocol can be 2×200 ps+800 ps=1200 ps, achieving a frequency of 0.833 GHz. Since this frequency is less than the target frequency, other methods are employed to meet the 1 GHz target. Another method known to those skilled in the art is to pipeline the communication channel, as depicted in the lower pipeline 601.

The lower pipeline 601 provides an example of the single communication channel in the upper pipeline 600 that has been split with pipelining into two communication channels, channel $i_0$ and channel $i_1$, in the lower pipeline with linear pipeline controller 630. Sets of data wires 622a-622d between the various controllers can transmit data. Request wirings 624a-624d and acknowledge wirings 626a-626d between the various controllers can handle flow control. The distance, and hence the communication delay, between 610 and 620 can be substantially the same as between 615 and 625 in the second pipeline. If the new pipeline controller 630 is physically placed in the middle of the channel between linear pipeline controllers 615 an 625, the wire communication latencies on channels $i_0$ and $i_1$ can be substantially half that ($L_c$/2) of the upper unpipelined handshake communication ($L_c$).

Assume the exemplary numbers of a 1 GHz frequency target, 800 ps control overhead for the sender and receiver controllers, and a 200 ps communication latency between control element 610 and control element 620 and between control element 615 and control element 625. The pipelined controller divides the 200 ps latency into two channels. At this frequency, a two-phase protocol can meet the timing target as the req delay across channel $i_0$ and $i_1$ can each take 100 ps, and likewise for the delay of the ack signal. This can allow each of channel $i_0$ and channel $i_1$ to operate at a cycle time of 1000 ps, reaching the 1 GHz target frequency and meeting the performance target. Thus pipelining is another method known to those skilled in the art to increase bandwidth of a communication link. Thus, this increased bandwidth comes at the cost of additional hardware and power, such as in the linear pipeline controller 630 added to the system.

However, if the frequency target of the design is increased to 1.5 GHz, a minimum cycle time of 666 ps results to meet the performance requirement. Since the control logic overhead of the sender and receiver logic is 800 ps, this design may not meet the design requirements. However, if one could design handshake control elements 610 and 620 to operate with 400 ps latency, then this design may meet the timing requirements. Thus another approach known by those skilled in the art is to design a controller employing a different communication channel protocol that can meet a higher frequency target.

Note that in the above approaches, the delay across the wires remains a necessary consideration when designing a handshake communication channel. Any wire delay, even a single pico second, can decrease the maximum bandwidth achievable by the channel, since the handshake phases occur sequentially. The delay across the wires, therefore, can limit the maximum achievable bandwidth in handshake based communication, as used by asynchronous communication designs, in contrast to clocked designs. Additionally, the above approaches come with costs, which can be illustrated with quantitative data.

Figure 7:
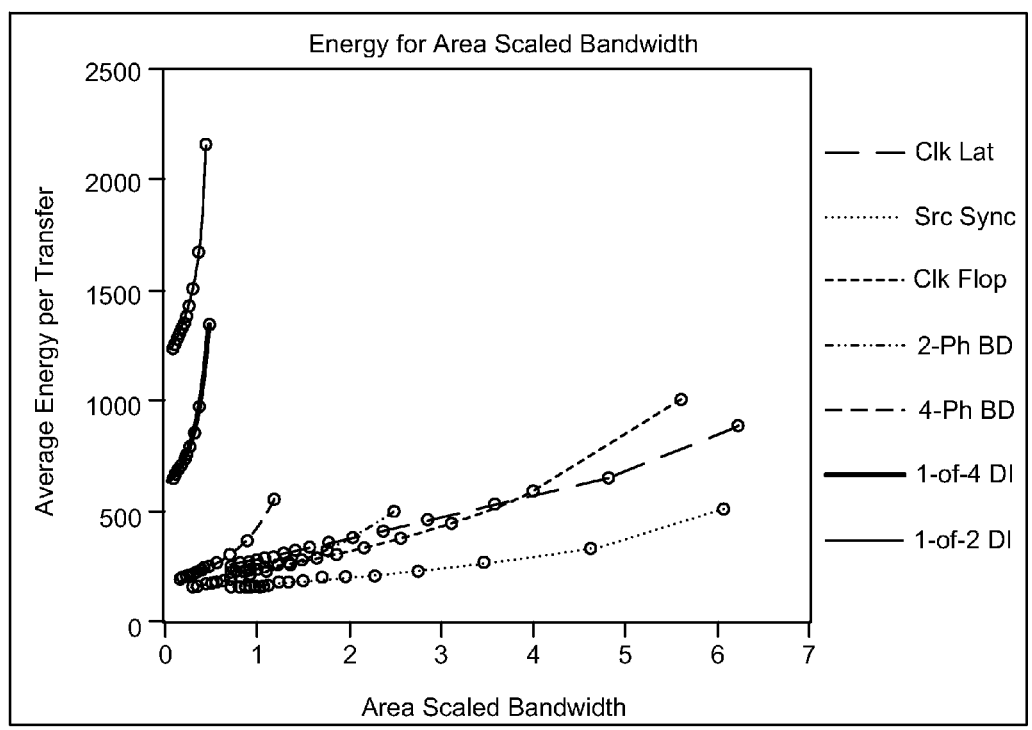
FIG. 7 illustrates a graph of the energy for the area scaled bandwidth for various communication channel protocols operating on a 10,000/micron (μm) link as a function of additional pipeline stages added to increase throughput in accordance with an example.

FIG. 7 provides a graph showing a comparison between various common handshake communication protocols, two clocked communication protocols, and a clocked source synchronous protocol where the clock timing is passed along with the data. The graph represents a 10 mm communication link in a 65 nm process technology. For signal fidelity and to achieve linear latency down the communication channel, repeaters are be placed approximately 650 mm apart. For each design, the communication link is pipelined where a separate pipeline controller can replace a repeater, splitting a single channel into two channels and subsequently improving the bandwidth.

In FIG. 7, the leftmost points for each protocol show the bandwidth achievable with a single unpipelined channel, and the rightmost points the achievable bandwidth on the same 10 mm channel with 16 pipeline controllers. As the channel is pipelined, greater bandwidth can be achieved. The x axis represents the total bandwidth divided by the wire area used by the signal encoding (in megabit/second*micron (Mb/s*μm) units).

The clocked designs assume binary encoded data, and provide a group of reference points. The dual-rail and 1-of-4 codes scale the result by w/(2w+1) since the acknowledgment operation uses one wire and the data encoding uses 2w wires to encode w binary data values plus data validity. The bundled data handshake protocols scale the bandwidth by w/(w+2), adding the overhead for the req and ack signal wires. The y axis reports the average energy per transaction (in picojoule/bit (pJ/bit) units) across the communication channel for similar activity factors.

Note that the techniques known to those skilled in the art to increase bandwidth are represented in FIG. 7. The two-phase bundled data protocol achieves approximately twice the maximum area scaled bandwidth as the four-phase protocols. Pipelining the control channels significantly increases the bandwidth for protocols as the overall wire delay is divided into smaller segments. (The cost for additional pipelining is an increase in energy for the communication.) Also note that the wire delay overhead can be significantly different between the clocked and asynchronous handshake protocols.

According to Equation (1), the minimum clock cycle time, and hence the maximum bandwidth, can be determined by the latency down the communication link. The four-phase handshake protocols (e.g., 1-of-2 DI, 1-of-4 DI, and four-phase bundled data (4-Ph BD) protocols) can be four-times worse as the minimum cycle time is bounded by four times the latency down the communication link. This pushes the four-phase handshake protocols to the left on the x axis and limiting the maximum bandwidth. The four-phase handshake protocols can include an asynchronous Delay-Insensitive link based on a 1-of-2 (1-of-2 DI) Level-Encoded Transition Signaling (LETS), an asynchronous DI link based on a 1-of-4 (1-of-4 DI) LETS, or a four-phase bundled data (4-Ph BD) protocol. The two-phase handshake protocols can include a two-phase bundled data (2-Ph BD) protocol. Other protocols can include a clock latency (Clk Lat) protocol, clock flop (Clk Flop) protocol, or a source synchronous (Src Sync or SAS) protocol.

Also note that the two-phase asynchronous handshake bundled data (2-Ph BD) protocol uses a 2× wire latency overhead. Thus if the extra wire area were ignored, the four-phase handshake protocols can achieve about one-fourth the maximum bandwidth and the two-phase handshake protocols can achieve about one-half the maximum bandwidth of the clocked designs. The Source Asynchronous Signaling (SAS) protocol provided allows asynchronous handshaking protocols to proceed without additional wire overhead, substantially irrespective of a distance of a communication channel, achieving the same or better performance as the clocked source synchronous architecture shown in FIG. 7. The improved performance for asynchronous designs achieved by SAS protocols allows the significant advantages of asynchronous designs, such as power savings associated with not having to propagate a clock signal, to be obtained without the previous disadvantages.

Figure 8:
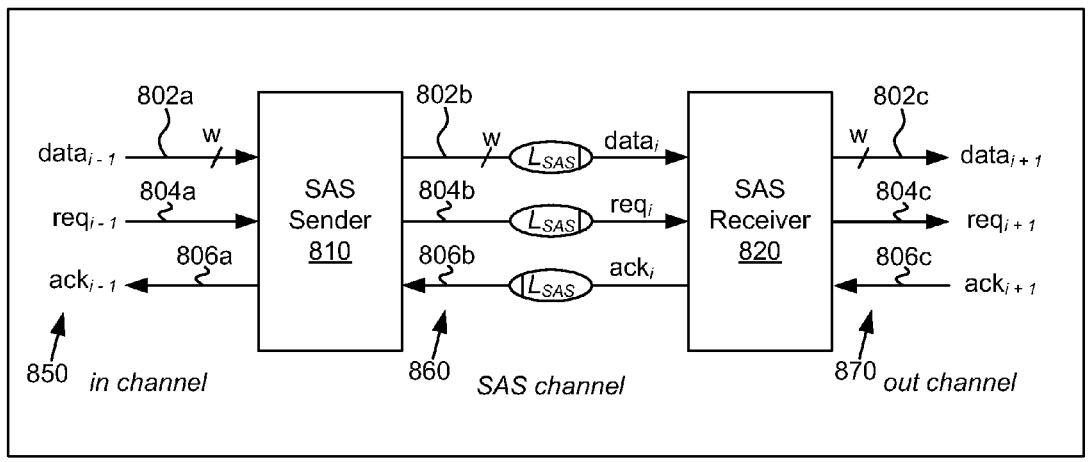
FIG. 8 illustrates a bundled data Source Asynchronous Signaling (SAS) system with a SAS channel that interfaces to standard input and output handshake communication channels in accordance with an example.

FIG. 8 illustrates an example to achieve overhead free, asynchronous handshake communication in accordance with a SAS protocol. This example provides a SAS channel protocol for a SAS channel 860 and two SAS handshake control element designs 810 and 820. In combination, the SAS protocol and SAS control elements can be used to create a latency that can be independent of the length of the SAS channel. One element can be a SAS sender element 810 and another element can be a SAS receiver element 820.

The SAS sender element/controller 810 can interface between a traditional communication channel 850, referred to as the in channel, on an input and a SAS channel 860 on an output. The SAS channel 860 can comprise a wired channel with a sender end and a receiver end, with a sender element/controller at the sender end. In an example, the wired channel can include repeaters and other circuits to assist in signal transmission. The in channel can comprise a first set of data wires 802a, with w elements, input request wiring 804a, and input acknowledge wiring 806a. Similarly, the SAS channel can comprise a second set of data wires 802b, with w elements to transmit data blocks and second request wiring 804b and second acknowledge wiring 806b for asynchronous flow control.

As stated, the sender element/controller 810 can be coupled to the input channel 850, which can provision the data blocks to the wired SAS channel 860. Furthermore, the sender controller can be configured to send multiple request signals up to a predefined limit over the request wiring 804b paired with multiple data blocks sent over the set of data wires 802b. The sender controller can send these request signals before receiving an acknowledgment signal on the acknowledge wiring 806b from the receiver controller.

A SAS receiver element/controller 820 can be coupled to the wired SAS channel 860 at the wired channel's receiver end on an input and can communicate with a traditional output communication channel 870 on an output, referred to as the out channel. The output channel, or out channel, can be configured to receive data blocks. The out channel can comprise an output set of data wires 802c, with w elements, output request wiring 804c, and output acknowledge wiring 806c. In some examples, the receiver controller can be configured to send a plurality of acknowledgment signals. These acknowledgment signals can indicate reception of a plurality of data blocks, to the sender controller 810 up to the predefined limit and can be sent in an absence of an intervening request signal sent over the request wiring 804b from the sender controller.

In some examples, the SAS channel 860, can be implemented as an asynchronous communication channel having computer circuitry. The computer circuitry can be configured to interface the input channel 850 with the SAS channel. The input channel can operate with a control-flow handshake protocol with an alternating request-acknowledgment pattern between requests and acknowledgments on input request wiring 804a and input acknowledge wiring 806a. The computer circuitry can accomplish this interface by means of the sender element 810.

The SAS channel can be capable of multiple relationships between requests and acknowledgments on request wiring 804a and acknowledge wiring 806a within the SAS channel. For example, a SAS channel can be capable of simultaneously transmitting multiple requests on the request wire and simultaneously multiple acknowledgments on the acknowledge wire within the SAS channel, where the multiple requests are propagating on different parts of the request wire, and the multiple acknowledgments are propagating on different parts of the acknowledge wire. The computer circuitry can also interface the SAS channel 860 with an output channel 870 operating with a control-flow handshake protocol with an alternating request-acknowledgment pattern over output request wiring 804c and output acknowledge wiring 806c. The computer circuitry can accomplish this additional interface by means of the receiver element 820.

In certain examples, computer circuitry residing within the sender element 810 can prevent a number of requests sent from the sender element from exceeding a predetermined limit without an intervening acknowledgment from the receiver element. Similarly, computer circuitry within the receiver element 820 can be configured to prevent a number of acknowledgments sent from the receiver element from exceeding the predetermined limit without an intervening request from the sender element. Additionally, in some examples computer circuitry can be configured to implement at least one timing constraint between any of the input channel 850, the output channel 870, the sender element, and the receiver element.

Signals on a traditional handshake communication channel and a SAS communication channel can be the same, and, at this level of hierarchy, no difference other than protocols between a SAS channel and a traditional handshake pipeline may exist, such as those depicted in FIG. 1 and FIG. 6. Thus, an SAS channel can be directly inserted into any handshake signal communication path. However, correct functioning of a SAS channel can have different components of the channel operating under certain timing constraints relative to one another. One or more combinations of the input channel, the sender controller, the output channel 870, and the receiver controller 820 can be configured to operate within at least one time constraint to avoid stalling the asynchronous flow control over the request wiring and the acknowledge wiring. Additional potential differences associated with a SAS channel protocol can be shown with the FIG. 9.

Figure 9:
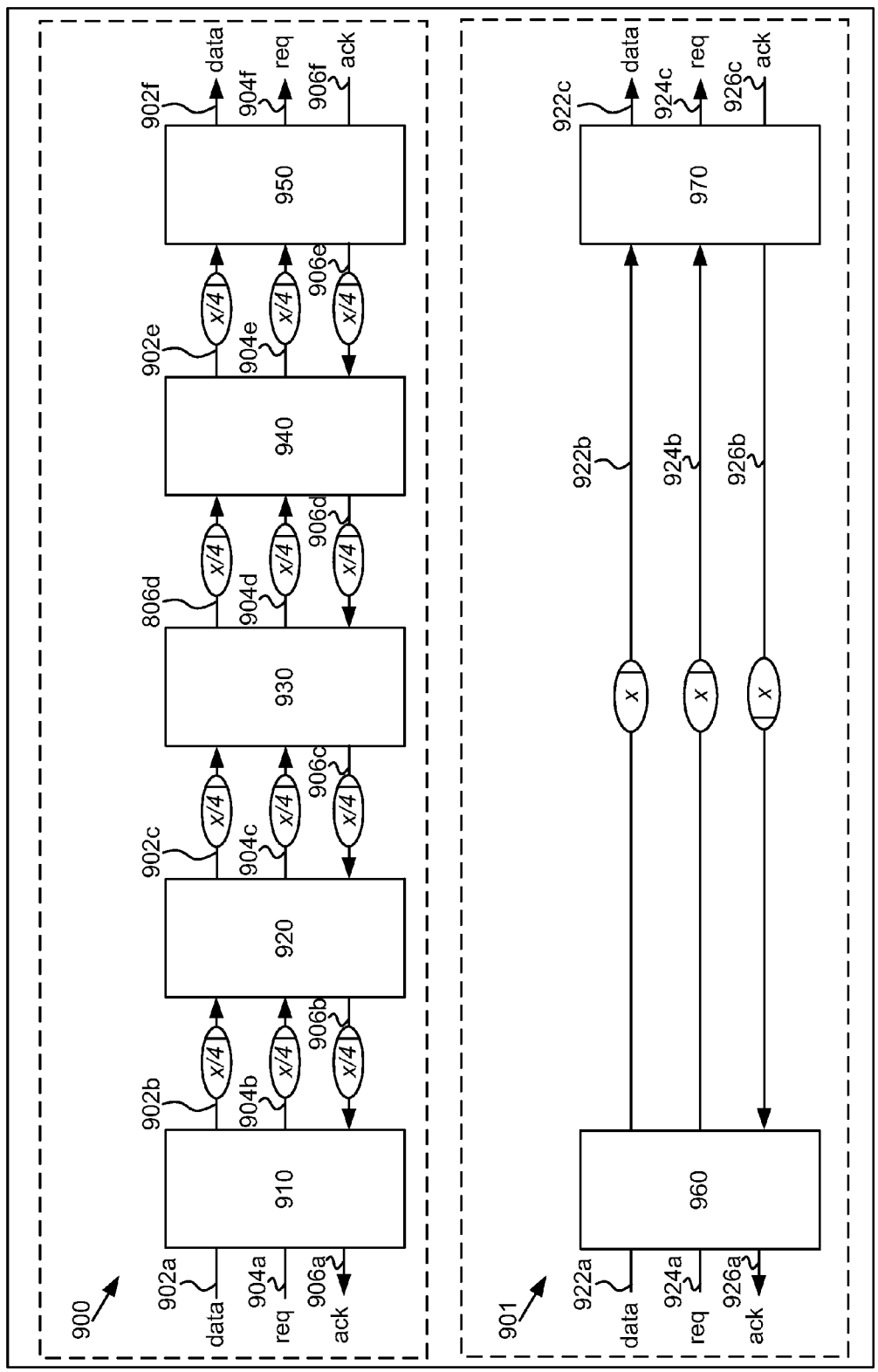
FIG. 9 illustrates a traditional pipelined implementation with multiple pipeline stages and a Source Asynchronous Signaling (SAS) design where two logic elements are used to communicate across a large latency communication channel in accordance with an example.

FIG. 9 illustrates differences between a traditional communication channel 900 with high latency and a SAS communication channel 901. The traditional communication channel can be pipelined into numerous stages with multiple control and/or storage elements 910-950 to achieve the desired performance. However, in the SAS channel, a single SAS sender element 960 and SAS receiver element 970 can be employed.

The SAS sender element 960 can receive data from an input set of data wires 922a, request handshake signaling over input request wiring 924a, and acknowledgment handshake signaling over input acknowledge wiring 926a. Data request handshake signaling and acknowledgment handshake signaling can be propagated down the long SAS channel on a second set of data wires 922b, request wiring 924b and acknowledge wiring 926b with a latency of x.

Conversely, the traditional communication channel 900 can be broken into four channels with a latency of x/4 to achieve better bandwidth. Leading into the first control and/or storage element 910, leading out of the fifth control and/or storage element 950, and between the intervening elements, can be corresponding sets of data wires 902a-902f, instances of request wiring 904a-904f, instances of acknowledge wiring 906a-906f. However, breaking up the traditional communication channel in this way is accomplished by the addition of a second 920, third 930, and fourth 940 control and/or storage elements, with the corresponding energy usage, area usage, and latency. Therefore, the two SAS control elements can achieve much higher throughput than the traditional highly pipelined communication link. Additionally, if deemed helpful, due to design considerations such as signal fidelity based on noise, a single SAS communication channel can also be pipelined into multiple stages.

The SAS communication channel 901 depicted can contain the same signals as a traditional asynchronous communication channel 900. However, the channel protocol that the signals perform can be different from the traditional RZ or NRZ channel protocols shown in FIG. 2 and FIG. 3. In the traditional asynchronous communication channel, flow control can be performed for every data transaction by requiring each request transaction to be acknowledged before proceeding. Thus in the traditional/standard communication channels with protocols similar to those in FIG. 2 and FIG. 3, each req transition can be followed by an ack transition and vice versa, creating a forever repeating sequence of req ack req ack transitions, or alternating request-acknowledgment pattern between requests and acknowledgments.

However, in the SAS protocol provided, flow control can be delayed. Thus a limiting number of request transactions can proceed before any acknowledgment transaction is received for flow control. Similarly, a limiting number of acknowledgment transactions can proceed before an intervening receive transaction is received at another control element. The limiting number of outstanding data request transactions that can occur before an acknowledgment can be known by both the SAS sender 960 element and SAS receiver element 970. Also, the limiting number of acknowledgment transactions that can be sent before an intervening request can be known by both the SAS sender element and SAS receiver element.

In examples of the provided SAS communication system, the implementation can buffer n data items. In such a system, the number of request transactions can be greater than or equal to the number of acknowledgment transactions, with a maximum limiting number of n+1 more request transactions than acknowledgment transactions. By way of illustration, for transaction j, the acknowledge signal j can provide flow control for signal j+n+1, hence signal $ack_j$ occurs before $req_{j+n+1}$.

Figure 10:
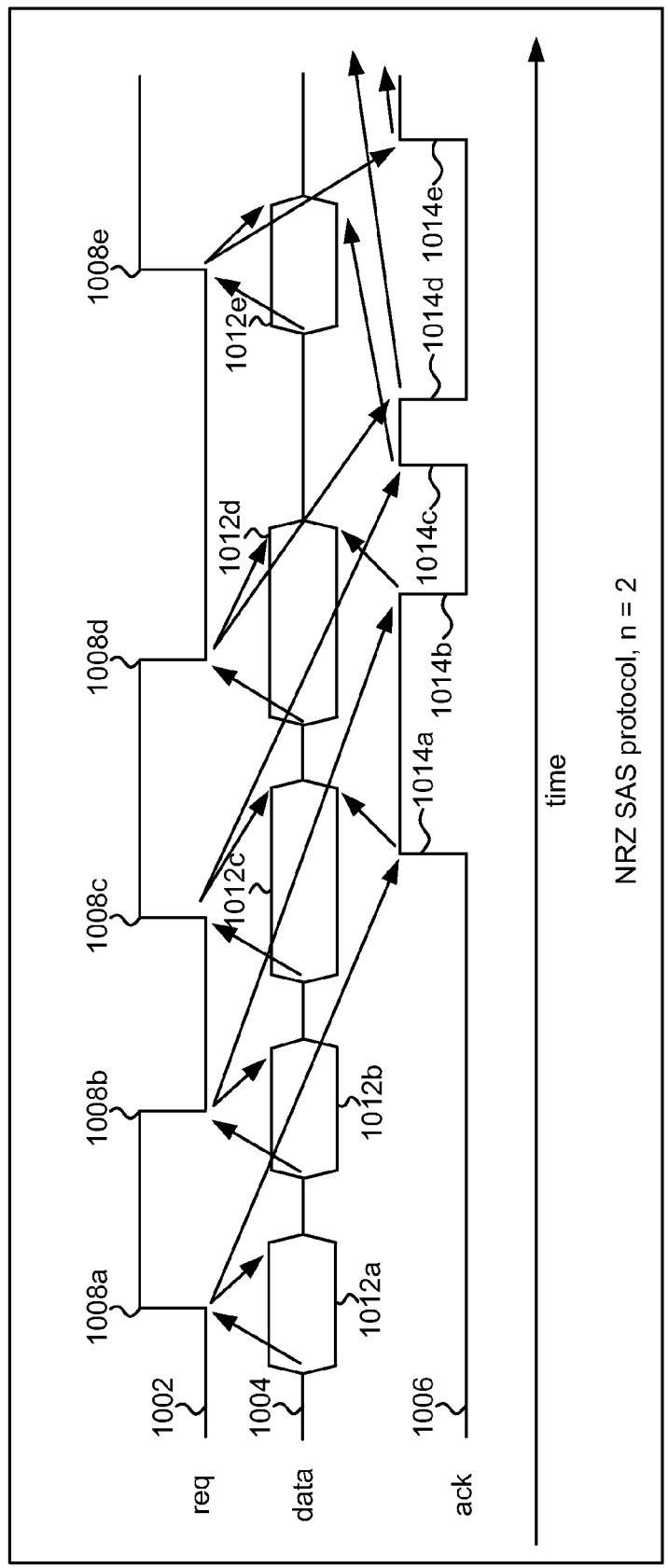
FIG. 10 illustrates dependencies for a two-phase "Non-Return-to-Zero" (NRZ) bundled data Source Asynchronous Signaling (SAS) channel protocol with two pipeline buffers in accordance with an example.

FIG. 10 illustrates data transmissions and supporting control signaling over a wired communication channel consistent with a two-phase NRZ SAS communication channel protocol, where n=2. The NRZ SAS communication channel protocol depicted in FIG. 10 can share a few similarities with the NRZ protocol depicted in FIG. 3 in that a single transition within request handshaking signaling can signal a request. Similarly, a single transition within acknowledgment handshaking signaling can signal an acknowledgment. Distinguishing differences, however, can include multiple requests being sent and/or received without reception and/or sending of an intervening acknowledgment and vice versa.

Three waveforms/signals 1002-1006 are depicted in FIG. 10, from the perspective of an SAS sender element 810, for purposes of illustrating aspects of the NRZ SAS communication channel protocol, including the previously mentioned differences. A req waveform/signal 1002 depicts request handshake signaling, which can be transmitted over request wiring 804b similar to that depicted in FIG. 8. A data waveform/signal 1004 depicts the transmission of a first data block 1012a through a fifth data block 1012e, potentially over the set of data wiring 802b similar to that depicted in FIG. 8. Also, an ack waveform/signal 1006 depicts acknowledgment handshake signaling, which can be transmitted on acknowledgment wiring 806b similar to that depicted in FIG. 8.

Arrows depicted in FIG. 10 between transitions within the waveforms/signals can indicate dependencies between transitions within the waveforms/signals 1002-1006. As with FIG. 3, before transmission of data, request and acknowledgment signaling can be at an idle (usually zero or low voltage) with one or more arbitrary values for data. The first arrow, from left to right, can indicate that after the first data block 1012a is driven on a set of data wires 802b by a SAS sender element 810, such as the one depicted in FIG. 8, the SAS sender element can also cause a first req transition 1008a within the req waveform 1002 from low to high voltage, or vice versa. As before, a request transition 1008 can serve multiple functions, such as a request for acknowledgment of data reception and/or storage, an indication of validity for a data block 1012 on the second set of data wires 802b, and/or a timing reference.

As indicated by the second arrow, after the first req transition, the SAS sender element 810 can stop maintaining signaling for the first data block 1012a. Once a SAS receiver element 820, such as the one depicted in FIG. 8, receives the first req transition 1008a, the SAS receiver element 820 can cause a first ack transition 1014a in the ack waveform 1006, as indicated by the third arrow.

However, unlike FIG. 3, the SAS sender element 810 need not wait to receive the first ack transition 1014a before sending the second data block 1012b. The SAS sender element can send up to n+1 more data blocks and/or request transitions than received acknowledgments. Therefore, the SAS sender element places the second data block 1012b on the second set of data wires 802b. After the second data block is transmitted, as indicated by the fourth arrow, from left to right, the SAS sender element can perform a second req transition 1008b within the req waveform/signal 1002 on the request wiring 804b. Upon receiving the second req transition, the SAS receiver element 820 can store and/or pass the second data block, based on the data validity indication embodied thereby. As indicated by the fifth arrow, the SAS sender element can then stop maintaining the second data block after a sufficient amount of time for the SAS receiver element to handle the data block. The sixth arrow indicates that second ack transition 1014b depends on the second req transition.

However, before the SAS sender element 810 receives the first ack transition 1014a or the second ack transition 1014b, the SAS sender can assert the third data block 1012c within the data waveform 1004, triggering the third req transition 1008c, as indicated by the seventh arrow. As indicated by the eighth arrow, the third req transmission can normally allow the SAS sender element to stop maintaining the third data block after a sufficient time to allow the SAS receiver element 820 to store and/or pass the third data block in addition to indicating that a third ack transition 1014c can be sent, as indicated by the ninth arrow.

However, an additional dependency is indicated by the tenth arrow from left to right. Since n=2 and n+1=3 for examples consistent with the depiction, the SAS sender element 810 has now sent 3, or n+1, data blocks and can send no more until an acknowledgment arrives. Only after the first ack transition 1014a is received at the SAS sender element 810 can the SAS sender element stop maintaining the third data block. In alternative embodiments, this dependence can place a restriction on the sending of the fourth data block 1012d, not on ceasing to maintain the third data block. By decoupling the SAS sender element 810 from an alternating one-to-one correspondence between requests and acknowledgments, allowing the SAS sender element to send multiple requests without an intervening acknowledgment, the channel latency associated with acknowledgment feedback can be reduced or removed as a limiting factor for data transmissions.

Upon reception of the first ack transition 1014a, the SAS sender 810 can stop maintaining the third data block 1012c, since the difference between signaled requests and/or data blocks and acknowledgments has been reduced to n. The SAS sender can also place the fourth data block 1012d onto the second set of data wires 802b, allowing the SAS sender to perform the fourth req transition 1008d, as indicated by the eleventh arrow. The fourth req transition can serve as a prerequisite for the fourth ack transition 1014d, as indicated by the twelfth arrow, and as a partial prerequisite for stopping maintenance of the fourth data block, as indicated by the thirteenth arrow. An additional perquisite can be reception by the SAS sender of the second ack transition 1014b, as indicated by the fourteenth arrow, because, at this point, the difference between signaled requests and/or data blocks and acknowledgments has increased again to n+1.

Yet, before the SAS sender 810 can transmit the fifth data block 1012e, the SAS sender can receive both the third ack transition 1014c and the fourth ack transition 1014d, without sending an intervening req transition. Reception of the third ack transition can provide one of the prerequisites for stopping to maintain transmission of a fifth data block 1012e once the third ack has been transmitted, as indicated by the fifteenth arrow. Similarly, reception of the fourth ack transition can provide one of the prerequisites for stopping to maintain transmission of a sixth data block (not depicted) once the fourth ack has been transmitted, as indicated by the sixteenth arrow. After reception of the fourth ack transition, the number of received ack transitions is equal to the number of req transitions and/or data blocks transmitted.

Therefore, by decoupling acknowledgment handshake signaling from an alternating one-to-one correspondence with requests and acknowledgments, the number of acknowledgments received by the SAS sender element 810 can be allowed to catch up to the requests signaled from the SAS sender element. As a result, in an example, the impact of channel latency on bandwidth can be determined by the time a transmission takes to travel down the SAS channel in one direction instead of the time to travel the first direction and back again to accommodate acknowledgment feedback. In another example, the channel latency on bandwidth can be determined by the time a between request transmissions. Since the value of n can be increased to compensate for increasing feedback latencies corresponding to increasing channel lengths, channel distance can be reduced or removed as a limiting factor with respect to bandwidth. Also, increasing area and/or energy costs associated with additional control elements, in addition to latencies inherent to those additional control elements, can be avoided or reduced.

With the transmission of the fifth data block 1012e, the process can start anew. A fifth req transition 1008e can be signaled, as indicated by the seventeenth arrow. Reception of the fifth req transition by the SAS receiver element 820 can result in a fifth ack transition 1014e, as indicated by arrow eighteen. The fifth req transition can also provide one prerequisite, as indicated by the nineteenth arrow, for stopping to maintain the fifth data block. The reception of the third ack transition 1014c can provide the other prerequisite, as indicated by the fifteenth arrow. Similarly, the fifth ack transition can provide one prerequisite to stop maintaining a future seventh data block. Although the process can continue, the process can continue with any number of different patterns of relationships between request and acknowledgment transitions, as long as the number of requests from the SAS sender element 810 does not exceed n+1 acknowledgments received.

In summary, the acknowledgment to data flow control can be shifted to the right by n+1 transactions. In the illustrated example, rather than requiring that the acknowledgment signal arrives before the next request signal, the acknowledgment to data flow control delays the completion of the data transfer three transactions later. As can be seen in FIG. 10, the third data value becomes valid and the third req signal asserts, indicating data validity, but flow control of the SAS channel protocol keeps the data valid and the third data transfer transaction does not complete until after the first acknowledge transaction occurs. So in the provided SAS channel communication protocol, the acknowledge flow control can be shifted based on the number of data items n that can be buffered in the SAS sender and SAS receiver elements. As can be appreciate, although not depicted, similar SAS channel protocols can be implements for four-phase, NRZ, handshake protocols and other handshake protocols known to those of ordinary skill in the art.

Figure 11:
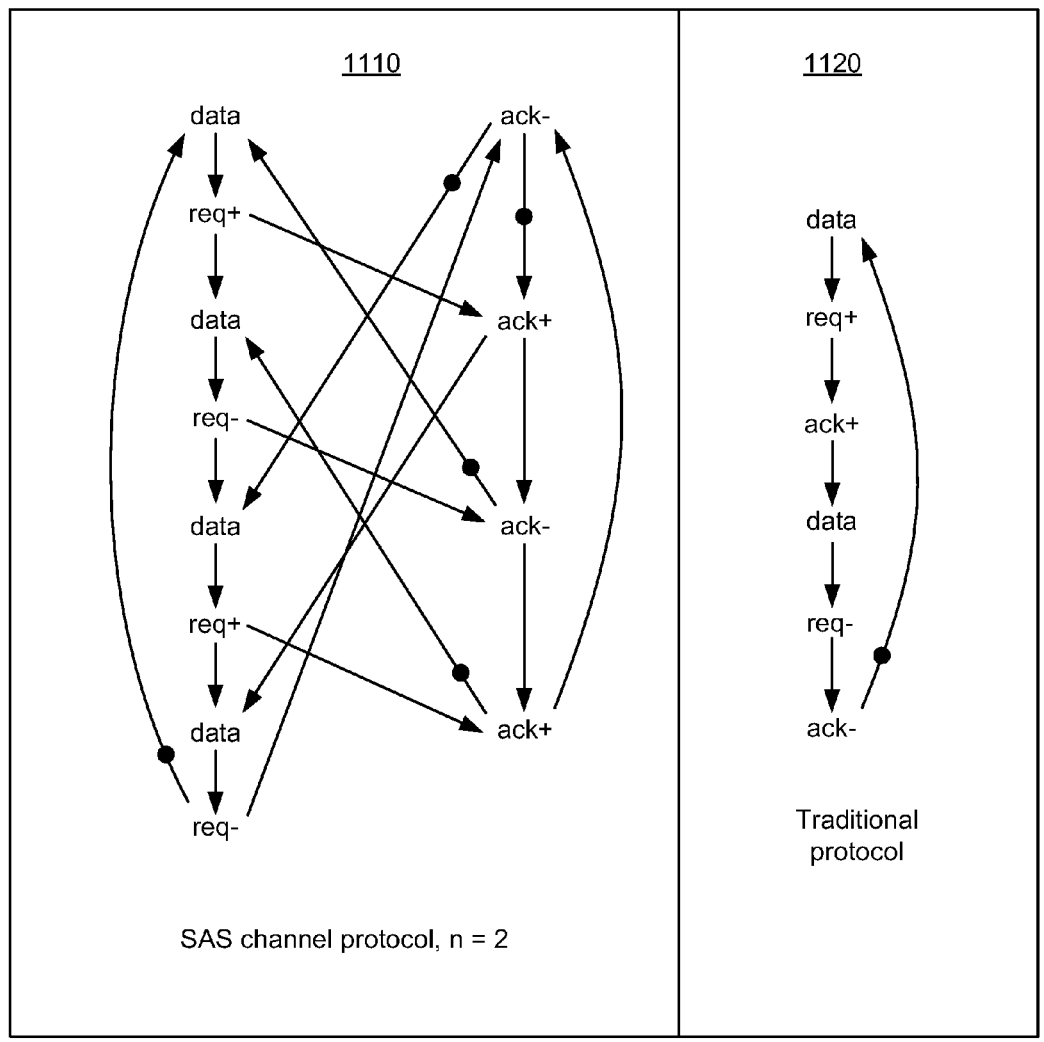
FIG. 11 illustrates the specification as a Petri net of an "Non-Return-to-Zero" (NRZ) two phase Source Asynchronous Signaling (SAS) channel protocol with a buffer depth of two and a traditional NRZ two phase handshake communication channel in accordance with an exemplary embodiment in accordance with an example.

FIG. 11 illustrates a formal representation of a NRZ SAS channel protocol 1110 with n=2 in comparison to a traditional handshake channel protocol 1120. Each protocol can be represented as a Petri net that can be used as a specification for the traditional or SAS communication channel protocols. The task of the SAS sender control 810 can be to interface a traditional channel protocol 1120 on the input to a SAS channel protocol 1110 on the output. Likewise, the task of the SAS receiver control 820 can be to interface between a SAS channel protocol 1110 on the input and a traditional channel protocol 1120 on the output.

As can be appreciated, although not depicted, similar Petri nets can be designed for SAS protocols with other values of n. Petri nets for SAS protocols can also be designed for four-phase, RZ, handshake protocols and other handshake protocols known to those of ordinary skill in the art. Such Petri nets can describe handshake protocols that can decouple request handshake signaling from having to receive at least one intervening acknowledgment for n+1 requests from acknowledgment handshake signaling and vice versa, while maintaining other aspects of differing underlying traditional handshake protocols.

Figure 12:
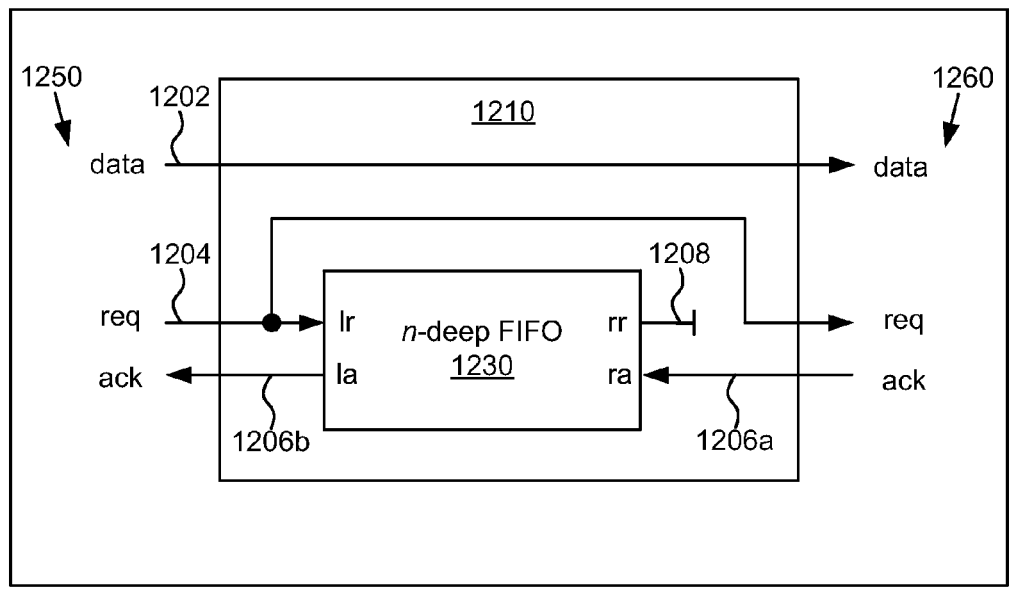
FIG. 12 illustrates the design of an Source Asynchronous Signaling (SAS) sender element using an asynchronous control First In, First Out (FIFO) element in accordance with an example.

FIG. 12 illustrates a non-limiting example of a SAS sender element 1210. In this example, the element consists of an n-deep First-In, First Out (FIFO) element 1230 that can interface between a traditional handshake communication channel 1250 and a SAS output communication channel 1260. The input channel 1250 can use any data encoding, data transfer protocol, protocol concurrency, or other modification to a traditional communication channel as known by those skilled in the art. The data encoding between the traditional input handshake communication channel 1250 and the SAS communication channel 1260 can be the same or different.

The function of the FIFO element 1230 can be to handle control handshake handling to not complete any transactions on the input channel that can exceed n transactions on the SAS communication channel. The function of the FIFO element can be accomplished by implementing an n-deep FIFO element to communicate between the traditional input communication channel 1250 and the SAS communication channel 1260. The input channel can comprise an input set of data wires 1202, input request wiring 1204, input acknowledge wiring 1206b.

The sender FIFO logic 1230 can have of a depth equal to a predefined limit and can track a difference between numbers for completed input transactions and completed communication transactions. An input transaction can be completed by the sender controller sending an acknowledgment signal to the input controller on the input acknowledge wiring. A communication transaction can be completed by the sender controller receiving an acknowledgment signal from the receiving controller on the acknowledge wiring. The sender FIFO logic can limit completed input transactions to ensure that the difference does not exceed a value equal to the predefined limit.

A set of data wires 1202 can be directly passed from the input channel 1250 through to the SAS communication channel 1260, bypassing the sender FIFO logic 1230 to become the set of data wires in the wired SAS channel 1260. the sender FIFO logic can comprise: an acknowledge input, or right acknowledge input (ra); an acknowledge output, or left acknowledge output (la); a request input, or left request input (lr); and, a request output, or right request output (rr). The acknowledge input (ra) can be connected to acknowledge wiring 1206a of the wired channel 1260. The acknowledge output (ra) can be connected to the input acknowledge wiring 1206b.

With respect to request signaling, the request input (lr) can be connected to a first branch of the input request wiring 1204. A second branch can bypass the sender FIFO logic 1230 to become request wiring in the wired SAS channel 1260. The request output can be unconnected 1208 so that the sender FIFO logic 1230 can become filled after request signals on the input request wiring equal a predefined limit without an intervening acknowledgment signal received at the acknowledge input (ra).

By way of illustration, the workings of the SAS sender element 1210 can be explained in terms of an exemplary scenario where n equals 2. The same description, however, can be applied to other values of n by replacing 2 with the corresponding value of n.

Where n=2, a first request transaction on the input request wiring 1204 can result in an acknowledgment transaction from the 2-deep FIFO element 1230 on the second acknowledgment wiring 1206b of the input channel 1250. Additionally, the corresponding data can be sent down the SAS channel 1260. A second request transaction can also result in a similar second acknowledgment transaction and a data transfer.

Completion of the first acknowledgment transaction and the second acknowledgment transaction on the input channel 1250, with their corresponding data transfers, may not use a reception of an acknowledgment transaction on the acknowledge wiring 1206a of the SAS channel 1260. Therefore, the traditional alternating request-acknowledgment pattern can be maintained on the traditional input channel while the sender FIFO logic is being filled with request tokens. At the same time, requests can be decoupled from the alternating request-acknowledgment pattern on the SAS channel, so that multiple requests can be sent on the SAS channel over the portion of the request wiring that bypasses the FIFO element.

After the second request transaction, the depth of the sender FIFO logic can have a value of two, and two tokens can be placed in the sender FIFO logic 1230 for two request transactions, the FIFO control element can be filled. A lack of assertion on the acknowledge input (ra) 1206a can prevent removing tokens from the FIFO logic. Leaving request output 1208 unconnected can generate a timing constraint for correct operation (e.g., rr transitions may precede ra transitions and alternate between rr transitions and ra transitions, as with a traditional handshake channel protocol). Therefore, a third transaction can begin on the input channel 1250 and the data transfer down the SAS communication channel 1260 can be initiated, so that n+1 data blocks have been sent of the SAS channel. However, no corresponding acknowledgment, as used by a traditional protocol, may be on the input channel. Therefore, neither the transaction on the input channel 1250 nor the SAS communication channel 1260 can complete until an acknowledge transaction occurs on the SAS communication channel 1260 to provide for another spot for a request in the FIFO element.

As a result, the data on the input channel 1250 and the SAS communication channel 1260 can remain valid until the acknowledgment transaction occurs on the SAS communication channel 1260. Also, the alternating request-acknowledgment pattern on the input channel 1250 can thus be maintained until an acknowledgment is received over the SAS channel 1260. Once received, the acknowledgment can be passed through to the input channel, satisfying the traditional alternating request-acknowledgment pattern so that a new request can be asserted. As discussed below, the sending of the first acknowledgment from a SAS receiver 820 can reduce a token count in the FIFO at the receiver end of the SAS channel. Other logic can be placed on the signals discussed above for various reasons, such as to improve signal fidelity, delay the timing reference, change the data and timing encoding, or other standard modifications as known by those skilled in the art.

In some examples, the sender FIFO logic 1230 can be implemented with computer circuitry as an n-deep FIFO element in the sender element 1210. The computer circuitry can be configured to place a token in the n-deep FIFO element for each request on the input channel 1250 until a number of tokens in the n-deep FIFO element equals a depth of the n-deep FIFO element.

The computer circuitry can also be configured to reduce the number of tokens for each acknowledgment from the SAS channel until the number of tokens equal zero. Furthermore, the computer circuitry can provide an acknowledgment on the input channel 1250 in response to a request from the input channel, unless the number of tokens placed in the n-deep FIFO element equals the depth of the element. The computer circuitry can further prevent an acknowledgment on the input channel in response to a request where the number of tokens placed in the n-deep FIFO element equals the depth of the element.

As explained, the lack of an acknowledge input (ra) 1206a on the sender FIFO logic 1230 can prevent more than n+1 data transfers. With the request output (rr) 1208 left unconnected, the circuitry can be configured to use the traditional channel protocol (e.g., channel handshake protocol of alternating rr ra rr ra signals). For example, proper operation can involve ensuring that all transitions on the request output (rr) of the FIFO element occur before an associated response occurs in terms of an acknowledge signal on the acknowledge wiring 1206a of the SAS channel 1260 that connects to the acknowledge input (ra) of the sender FIFO logic.

Therefore, in some examples, the request output (rr) of sender FIFO logic 1230 and a receiver controller 820 can be configured to operate within a request-transition timing constraint. The timing constraint can be that each transition on the request output occur before an acknowledgment signal on the acknowledge wiring 1206a of the wired SAS channel 1260. In one such example, the sender FIFO logic can be configured with a response time less than the delay between acknowledgment transitions. In another example, the SAS receiver can be configured with a delay between acknowledgment transactions that is greater than the response time of the sender FIFO element. Additionally, a SAS sender element may not be limited to bundled data protocols. Dual-rail, one-of-four, m-of-n, LEDR, or any other data encoding can be used in on the channels and in the sender FIFO element to satisfy timing constraints. Likewise, any type of asynchronous handshaking FIFO element as known by those skilled in the art can be used to meet timing constraints imposed upon the design.

Figure 13:
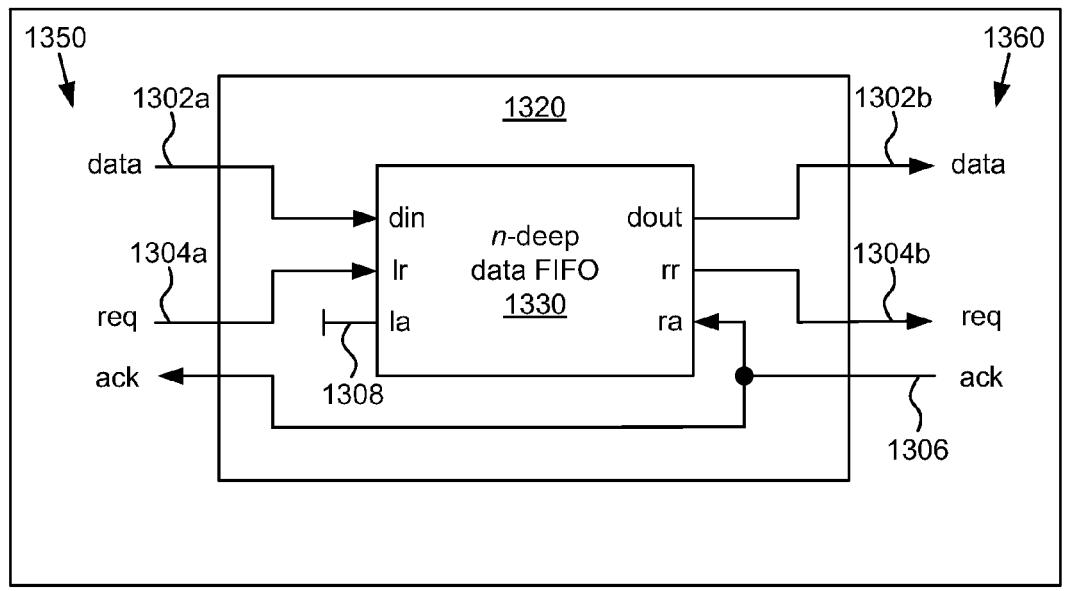
FIG. 13 illustrates the design of an Source Asynchronous Signaling (SAS) receiver element using an asynchronous data First In, First Out (FIFO) element in accordance with an example.

FIG. 13 illustrates a non-limiting example of a SAS receiver element 1320. The SAS receiver element circuit can, in many ways, be the dual of the SAS sender element 1210 depicted in FIG. 12. The SAS receiver element can contain an n-deep data FIFO 1330 that can interface an input SAS communication channel 1350 with a traditional output asynchronous handshake channel 1360. The input SAS channel 1350 and traditional output channel 1360 can use any data encoding, data transfer protocol, protocol concurrency, or other modification to a traditional communication channel as known by those skilled in the art.

The data encoding between the SAS communication channel 1350 and the traditional output handshake communication channel 1360 can be the same or different. The function of the data FIFO element 1320 can be to buffer and output the data received on the input SAS channel 1350 to the output channel 1360. The size of the data FIFO element can be n. The size of the n-deep data FIFO element can be the same depth as the n-deep FIFO element 1230 depicted in FIG. 12.

In some examples, an output controller (not depicted) can be found within the output channel 1360. The output channel can further comprise output request wiring 1304b, output acknowledge wiring 1306, and an output set of data wires 1302b. The data FIFO element 1330, residing within the receiver controller 1320, can comprise receiver FIFO logic of a depth equal the predefined limit. The receiver FIFO logic can be configured to buffer a set of data blocks received over the set of data wires 1302a of the wired SAS channel 1350 up to the predefined limit.

In some, but not all examples, an input set of data wires 1302a from the SAS communication channel 1350 can be coupled to a data input (din) of the n-deep data FIFO element 1330 so that n data blocks can be stored in the data FIFO element. An output set of data wires 1302b leading to the output channel 1360 can be coupled to a data output (dout) of the data FIFO element. Data can be placed on the output as directed by control handshake signaling taking place via the FIFO element. In some examples, the receiver FIFO logic can comprise an n-deep FIFO storage element for storage elements under the control of a separate n-deep FIFO control-flow element.

Additionally, the receiver FIFO logic 1330 can be configured to limit placement of the set of data blocks on the output set of data wires 1302b. The data blocks can be placed on the output set of data wires 1302b in an order received. The receiver FIFO logic can limit the data blocks to one per acknowledgment signal received from the output controller on the output acknowledge wiring 1306, despite multiple acknowledgment signals being sent on the acknowledge wiring within the wired SAS channel 1350 without an intervening request signal on the request wiring 1304a.

In some examples, the receiver FIFO logic 1330 can comprise: a request input, which can be referred to as the left request input (lr); a request output, which can be referred to as the right request output (rr); an acknowledge output, which can be referred to as the left acknowledge output (la); an acknowledge input, which can be referred to as the right acknowledge input (ra); and, and a FIFO storage element further comprising a data input (din) connected to the set of data wires 1302a of the wired SAS channel 1350 and a data output (dout) connected to the output set of data wires 1302b. The request input (lr) can be connected to the request wiring 1304a in the wired SAS channel 1350. The request output (rr) can be connected to the output request wiring 1304b in the output channel 1360.

With respect to the acknowledgment signaling, the acknowledge input (ra) can be connected to a first branch of the output acknowledge wiring 1306. A second branch can bypass the receiver FIFO logic to become the acknowledge wiring in the wired SAS channel 1350. The acknowledge output (la) can remain unconnected 1308 to the acknowledge wiring 1306 in the wired SAS channel to decouple request signaling from acknowledgment signaling on the wired SAS channel.

Therefore, the acknowledge signal (ack) on the output handshake channel 1360 and the SAS communication channel 1350 can be a same signal. Other logic can be placed on this signal for various reasons, such as to improve signal fidelity, change the timing encoding, or other standard modifications as known by those skilled in the art.

Since a portion of the acknowledgment wiring 1306 bypasses the FIFO element 1330, acknowledgment signaling can be decoupled from request signaling on the SAS channel 1350. Multiple acknowledgment signals can be sent without an intervening request signal. This capability can allow the number of acknowledgments to catch up on the SAS channel after more requests and data blocks have been transmitted on the SAS channel. Since another portion of the acknowledgment wiring can be coupled to the data FIFO element 1330, acknowledgments from the output channel 1360 can drive the relay of data blocks and requests through the data FIFO element 1330 in a way that maintains their ordering and the request-acknowledgment pattern used by the traditional protocol employed on the output channel 1360.

Certain examples can be implemented with computer circuitry within the receiver element 1320 that can be configured to implement an n-deep FIFO control-flow element 1330. The n-deep FIFO control-flow element can be configured to store a second number of tokens. Each token can correspond to a request asserted on the SAS channel 1350, up to the predetermined limit. Furthermore, each token can result in a request on the output channel 1360 after an acknowledgment received at the n-deep FIFO control-flow element. The acknowledgment can be relieved from the output channel during a period when a request is not asserted on the SAS channel. The acknowledgment received at the n-deep FIFO control-flow element can also be communicated to bypass the n-deep FIFO control-flow element to propagate directly over the SAS channel to allow a number of acknowledgments up to the predetermined limit to be transmitted over the SAS channel without an intervening request on the SAS channel.

Additional computer circuitry can implement a storage element controlled by the n-deep FIFO control-flow element, together making up the receiver FIFO logic 1330. The additional computer circuitry can be configured to store data blocks provided on a SAS set of data wires within the SAS channel up to the predetermined limit within an n-deep FIFO storage element, wherein a stage in the n-deep FIFO storage element for storing a data block is communicatively coupled to a control stage in the n-deep FIFO control-flow element. Additionally, the additional computer circuitry can be configured to place a data block on an output set of data wires within the output channel in response to each acknowledgment received at the n-deep FIFO control-flow element from the output channel until the n-deep FIFO storage element is emptied and no data blocks remain on the SAS set of data wires within SAS channel.

As stated, the left acknowledgment (la) from the receiver FIFO logic 1330 can be left unconnected to decouple acknowledgment signaling on the SAS channel 1350 from the request-acknowledgment pattern. To accommodate data transfers between the SAS channel 1350 and the output channel 1360 where the acknowledge output (la) can be unconnected, circuitry can be configured to implement timing constraints that ensure correct operation. For example, proper operation can involve ensuring that the acknowledge output (la) of the receiver FIFO logic and the sender controller 1320 are configured to operate within an acknowledge-transition timing constraint.

The acknowledge-transition timing constraint can be that transitions on the acknowledge output (la) occur before the next request signal on the request wiring 1304a of the wired SAS channel. Therefore, circuitry for the data FIFO element 1330 can be configured so that the response time of the data FIFO element can be less than the delay signals on the SAS channel 1350 and/or the SAS sender element 1210 in FIG. 12 can be configured to increase delay in such signals. As can be appreciated, the exemplary embodiment of the SAS receiver element may not be limited to bundled data protocols. Dual-rail, one-of-four, m-of-n, LEDR, or any other data encoding may be used on the channels and in the FIFO logic 1330.

Figure 14:
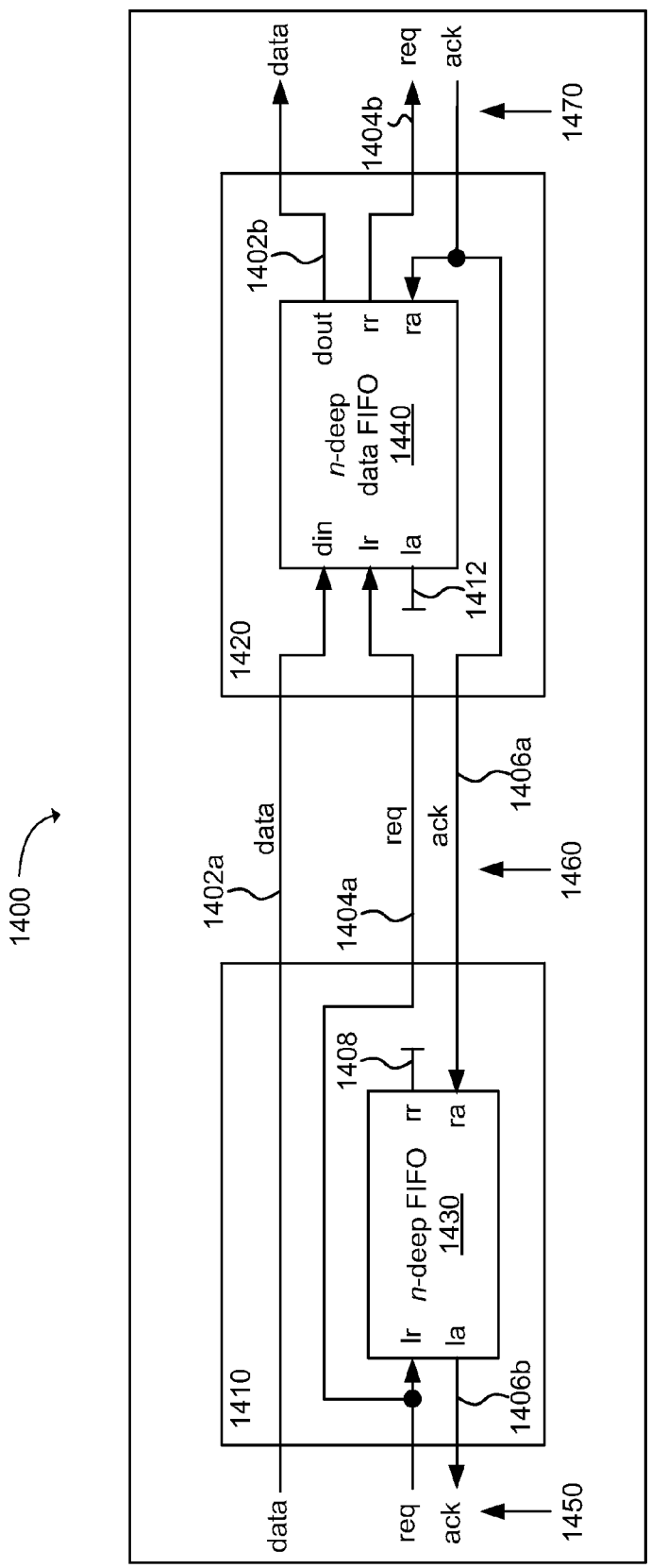
FIG. 14 illustrates a complete Source Asynchronous Signaling (SAS) communication system that interfaces with traditional handshake channels in accordance with an example.

FIG. 14 illustrates a non-limiting example of a SAS communication system with interfaces between a SAS channel 1460 and a traditional communication input channel 1450 and output channel 1470. To ensure proper implementation of, and interfacing between, the channels, circuitry can be configured with timing constraints, comprising those identified herein below.

The SAS system can comprise a sender element 1410 configured to interface between a traditional input channel 1450 and a SAS channel 1460. The SAS system can also comprise a receiver element 1420 configured to interface between the SAS communication channel and a traditional output channel 1470. In certain examples the input channel and/or the output channel can alternatively comprise a SAS communication channel.

An n-deep FIFO element 1430 can be included with the SAS sender element 1410. Similarly, the receiver element 1420 can include an n-deep data FIFO element. A first set of data wires 1402a can be configured to pass through the SAS sender element without interacting with the FIFO element included therein. The first set of data wires can be coupled with a data input (din) of the data FIFO element within the SAS receiver. A second set of data wires 1402b can be communicatively coupled with a data output of the data FIFO element within the SAS receiver.

As in FIG. 12, first request wiring 1404a can be coupled with a request input, left request (lr), of the FIFO element 1430 in the SAS sender element 1410. A portion of the first request wiring can also bypass the FIFO element in the SAS sender to traverse the SAS channel 1460 and be coupled to the request input, left request (lr), of the data FIFO element 1440 in the SAS receiver 1420. The request output, right request (rr), of the FIFO element in the SAS sender can remain with unconnected wiring 1408. Second request wiring 1404b, leading to the output channel 1470, can be coupled to the request output, right request (rr) of the data FIFO element in the SAS receiver element.

As in FIG. 12, input request wiring 1404a can be coupled with the request input (lr) of the FIFO element 1430 in the SAS sender element 1410. A portion of the input request wiring can also bypass the FIFO element in the SAS sender to traverse the SAS channel 1460 and be coupled to the request input (lr) of the data FIFO element 1440 in the SAS receiver. The request output (rr) of the FIFO element in the SAS sender can remain with unconnected wiring 1408. Output request wiring 1404b, leading to the output channel 1470, can be coupled to the request output (rr) of the data FIFO element in the SAS receiver element.

A first timing constraint can be that the cycle time of the input channel 1450 is greater than the cycle time of the data FIFO element 1440 in the SAS receiver element 1420 to ensure that following each lr signal, the la signal in FIFO 1440 occurs before the subsequent lr signal. The cycle time of the output channel 1470 can likewise be greater than the cycle time of the data FIFO element 1430 in the SAS sender element 1410 to ensure that following each ra signal, the rr signal on FIFO 1430 occurs before the subsequent ra signal. As one of the advantages of such examples, the wires across the SAS channel 1460 can be of arbitrary length and can have substantial delay.

Both the request and acknowledge timing signals across the SAS channel 1460 may not be acknowledged, therefore, the request and acknowledge timing signals can be sent down the SAS Channel 1460 as pulses. Depending on the length of the SAS channel and a potential need, care can be taken to ensure that the fidelity of the signals and the relationship between the data and the timing signals holds across the SAS channel. For long channels, repeaters can be inserted on the wires. Also, or in the alternative, for long channels, wave pipelining can occur where a subsequent transaction is sent down the SAS communication channel before a previous transaction reaches the end of the channel.

For a properly designed SAS communication system, the maximum bandwidth $B_{SAS}$ can be expressed as in equation 4, where $C_I$ is the maximum cycle time of the input channel 1450, as set forth below. Note that equation 4 can be strictly dependent upon the target frequency of data to be sent down the channel, not upon wire delays as is the case with traditional communication channels as shown in equations 1 through 3. Thus the SAS channel provided can achieve wire overhead free communication down a long communication channel. However, for the SAS communication system to operate properly, a number of time constraints may be implemented as described below.

$$B_{SAS} = w/C_I \qquad (4)$$

In order to achieve overhead free communication across a long channel, a correct depth and protocol of the FIFO element 1430 and data FIFO element 1440 can be determined. The depth and protocol of the FIFO elements can be calculated with variable definitions 5-13 for a first order approximation.

| | | |
|---|---|---|
| $L_{SAS}$ | Latency of a repeated wire down SAS channel 1460 | (5) |
| n | Depth of FIFO elements 1430 and 1440 | (6) |
| $L_{bS}$ | Backward latency of FIFO 1430 as a function of n | (7) |
| $L_{fR}$ | Forward latency of data FIFO 1440 as a function of n | (8) |
| $L_{bR}$ | Backward latency of data FIFO 1440 as a function of n | (9) |
| $C_I$ | Minimum cycle time of the input channel 1450 | (10) |
| $C_O$ | Minimum cycle time of the output channel 1470 | (11) |
| $C_{Sf}$ | Maximum cycle time of SAS sender FIFO 1430 | (12) |
| $C_{Rf}$ | Maximum cycle time of SAS receiver FIFO 1440 | (13) |

The forward and backward latency of FIFO designs can be a function of the depth n of the FIFO element. For linear FIFOs, the latency can be substantially n times the latency of each stage in the FIFO. Many designs exist that can reduce the forward and backward latencies, such as parallel, tree, square, or any other FIFO structure known to those skilled in the art. In these designs, the latency may not be calculated as n times latency per stage. Rather a more complicated function can be used to determine latency.

For example, in an asynchronous tree FIFO element, the latency is, to the first order, $\log_2 n$ times the latency per stage. For the latency values disclosed herein, the forward and backward latency values $L_{bS}$, $L_{fR}$, and $L_{bR}$ for each FIFO can be assumed for generality and simplicity of representation to be the total latency of the FIFO design divided by n. When looking at a specific FIFO design, the correct first order latency approximation equations can be used to get accurate results.

Overhead free communication can occur where the data in the input channel 1450 operates at frequency $1/C_I$ without stalling. To prevent stalling, the circuitry of the SAS communication system can be configured to ensure that one or more of timing constraints or inequalities 14-18 hold based on the above variables:

$$C_I \geq C_{Sf}, \tag{14}$$

$$C_O \geq C_{Rf}, \tag{15}$$

$$C_I \geq C_O, \tag{16}$$

$$C_I \geq C_{Rf}, \tag{17}$$

$$C_O \geq C_{Sf}. \tag{18}$$

As stated in timing constraint or inequality (16) the input channel 1450 and the output channel 1470 can be configured to operate within an edge timing constraint. The edge timing constraint can be that a minimum input cycle time of the input channel, $C_I$, is greater than or equal to a minimum output cycle time, $C_O$, of the output channel to avoid stalling the asynchronous flow control. As stated in timing constraint or inequality (17), the input channel and the receiver FIFO logic 1440 can be configured to operate within an input timing constraint. The input timing constraint can be that a minimum input cycle time of the input channel, $C_I$, is greater than or equal to a maximum receiver-FIFO cycle time, $C_{Rf}$, of the receiver FIFO logic to avoid stalling the asynchronous flow control. Timing constraint or inequality (18) states that the output channel and the sender FIFO logic can be configured to operate within an output timing constraint. The output timing constraint can be that a minimum output cycle time, $C_O$, of the output channel is greater than or equal to a maximum sender-FIFO cycle time, $C_{Sf}$, of the sender FIFO logic to avoid stalling the asynchronous flow control.

Since the input channel request can drive the SAS receiver data FIFO element 1440, and the request transaction may not be acknowledged by the data FIFO element of the SAS receiver, the data FIFO element can be configured, and/or circuitry in the input channel can be selected, so that the data FIFO element can operate faster than the input channel. Likewise, the SAS sender FIFO element 1430 handshake with the output channel 1470 may not be acknowledged and corresponding circuitry, in the FIFO element and/or for the output channel can be configured so that a similar timing constraint holds.

As can be appreciated, equations 14 through 18 can be consolidated into a single inequality: $C_I \geq C_O \geq C_{Sf}, C_{Rf}$. The cycle time of input channel, $C_I$, 1450 is, therefore, the base factor all equations depend upon. The cycle time can dictate the frequency of operation of the SAS communication system. Hence, in certain examples, the input channel 1450, the output channel 1470, the sender FIFO logic 1430, and the receiver FIFO logic 1440 can be configured to operate under a first time constraint and a second time constraint. The first timing constraint can be that a minimum input cycle time, $C_I$, of the input channel is greater than or equal to a minimum output cycle time, $C_O$, of the output channel. The second time constraint can be that the minimum output cycle time, $C_O$, is greater than or equal to both a maximum sender-FIFO cycle time, $C_{Sf}$, of the sender FIFO logic and a maximum receiver-FIFO cycle time, $C_{Rf}$, of the receiver FIFO logic to avoid stalling the asynchronous flow control.

The two values $T_{Sn}$ (19) and $T_{RSAS}$ (20) can be used to define additional constraints of a SAS communication system. The values can be based on the fundamental delays and properties of the links and FIFO elements 1430, 1440 defined above.

| | | |
|---|---|---|
| $T_{Sn}$ | Time to fill sender FIFO element 1430 with n tokens | (19) |
| $T_{RSAS}$ | Response time of the SAS system | (20) |

The response time $T_{RSAS}$ is the time from when one data transaction is asserted on the input channel 1450 until the entire SAS communication system becomes idle, and the sender FIFO element 1430 is empty when no new tokens are added to the system and none of the channels stall.

The delay of these variables (e.g., 19 and 20) in a SAS communication system can be calculated as follows. The FIFO element 1430 in the SAS sender element 1410 can fill, and stalls the input channel 1450 on the n+1 transaction if no acknowledge transaction occurs on the SAS channel 1460. The response time across a SAS communication system can be calculated as the sum of: the latency down the SAS channel 1460, $L_{SAS}$; the forward latency of the data FIFO element 1440, $n \times L_{fR}$; the response time of the output channel 1470, $C_O$, the latency back down the SAS Channel 1460, $L_{SAS}$; and the backward latency down FIFO element 1430, $n \times L_{bS}$. Mathematically, these delays can be expressed as equations 21 and 22:

$$T_{Sn} = (n+1) \times C_I, \tag{21}$$

$$T_{RSAS} = 2 \times L_{SAS} + n \times L_{fR} + n \times L_{bS} + C_{Or}. \tag{22}$$

Where $T_{Sn} < T_{RSAS}$, the input channel 1450 can stall because the FIFO element 1430 in the SAS sender element 1410 can become full before an acknowledgment is received at FIFO 1430 on ack wiring 1406a. Once the FIFO element is full the FIFO may be unable to accept more transactions until the response time $T_{RSAS}$ occurs. Occurrence of the response time $T_{RSAS}$ allows a new transaction to be stored in the FIFO logic 1430. Thus, the following circuitry related to the SAS system can be configured to ensure inequality (23) holds so the SAS system can operate without stalling:

$$T_{Sn} \geq T_{RSAS}. \quad (23)$$

Therefore, the output channel 1470, the wired channel 1460, the sender FIFO logic 1430, and the receiver FIFO logic 1440 can be configured to operate within a filling timing constraint. The filling time constraint can be that a filling time to fill the sender FIFO logic with a number of tokens equals a number of request signals asserted on the input request wiring 1404a and equal to the predefined limit, $T_{Sn}$, is greater than or equal to a response time, $T_{RSAS}$. The response time, $T_{RSAS}$, can be equal to a time between when a first data block is provided on the input request wiring and when the sender FIFO logic and the receiver FIFO logic are empty and the wired channel is idle when only a single token has been transmitted.

Substituting Equation (21) and Equation (22) into Inequality (23) in the results in the following inequality:

$$(n+1) \times C_I \geq 2 \times L_{SAS} + n \times L_{fR} + n \times L_{bS} + C_{Or}. \quad (24)$$

As n increases, the value of both sides of Inequality (24) grow. Where $C_I \leq L_{fR} + L_{bS}$, adding FIFO stages does not increase, and may decrease, the SAS channel latency $L_{SAS}$ that can be employed. Therefore, circuitry related to the SAS system can be configured to ensure the following inequality holds:

$$C_I > L_{fR} + L_{bS}. \quad (25)$$

Hence, the sender FIFO logic 1430, and the receiver FIFO logic are configured to operate within a precondition timing constraint. The precondition timing constraint can be that a minimum input cycle time of the input channel, $C_I$, is greater than a sum of a forward latency, $L_{fR}$, of the receiver FIFO logic 1440 and a backward latency, $L_{bS}$, of the sender FIFO logic. Inequality (25) indicates that some SAS communication system designs may not produce valid solutions based on the properties of the FIFO elements that are used in the design. In practice some SAS communication system designs has been shown to not produce valid solutions. For example, linear FIFO elements have a larger average forward and backward latency per stage than other FIFOs. When linear FIFOs are employed for the FIFO logic 1430 in the SAS sender element 1410 and the data FIFO element 1440, the above inequality may not hold and the SAS communication system can be non-functional, as has been validated in design simulations.

When n is decreased to zero, inequality (24) becomes $C_I \geq 2 \times L_{SAS} + C_{Or}$. This means that the SAS design becomes equivalent to a traditional channel when the input cycle time is exceeds the wire delay plus output channel response time. Therefore, the right side of inequality (24) is equal to the denominator of the two phased traditional handshake protocol in equation (2) where $L_c = L_{SAS}$. This shows that such a SAS system can be replaced with a traditional two-cycle design at such frequencies and wire latencies. The sender and receiver FIFOs 1430 and 1440 can be removed, and the input and output ports can be directly wired together, which can be accomplished by connecting 1402a to 1402b, 1404a to 1404b, and 1406a to 1406b. Thus, the design can implement a traditional handshake channel. The equation for n can be expressed as inequality 26:

$$n \geq (2 \times L_{SAS} + C_{Or} - C_I)/(C_I - (L_{fR} + L_{bS})). \quad (26)$$

Inequality 26 shows that the depth n of the FIFOs in the SAS communication can be critically dependent on the FIFO element's latency. As the forward and backward latencies $L_{fR} + L_{bS}$ approach the input cycle time $C_I$, n approaches infinity. Thus, efficient designs can select an FIFO element 1430 in the SAS sender element 1410 that has a small backward latency, $L_{bS}$, and a data FIFO element 1440 in the SAS receiver element 14240 that has a small forward latency $L_{fR}$.

Accordingly, the sender FIFO logic 1430 in the sender controller and the receiver FIFO logic 1440 in the receiver controller 1420 can be configured with a common depth, n, that is greater than or equal to a first value divided by a second value. The first value can equal twice a channel latency time, $L_{SAS}$, of the wired channel 1460 plus a minimum output cycle time of the output channel, $C_O$. The second value can equal the minimum input cycle time of the input channel $C_I$ less a sum. The sum can equal the backward latency, $L_{bS}$, of the sender FIFO logic within the sender controller and the forward latency, $L_{fR}$, of the receiver FIFO logic within the receiver controller.

Another parameter for SAS communication system designs can be the cycle time of the input channel 1450, $C_I$. As the cycle time increases, the inequality becomes easier to solve. As the frequency increases (cycle time decreases) the depth n of the FIFO elements increase substantially. While a SAS communication system can operate without wire overhead, a challenge of building a robust system can increase as the input channel frequency increases due to issues of signal fidelity down the SAS channel 1460 as well as the tighter constraints on the FIFO elements and area increases due to the larger FIFO depths, n.

Finally let $\Delta = C_I - (L_{fR} + L_{bS})$, which defines the margin that is gained in a SAS communication system 1400 in FIG. 14 for every stage added to the FIFO elements. Combining Equation (26) with the equation for A results in Equation (27). Equation (27) shows that as A grows, smaller FIFO elements may be used:

$$n \times \Delta \geq 2 \times L_{SAS} + C_O - C_I \quad (27)$$

Thus for a valid design, a minimum FIFO depth n can be determined that can give a valid solution for any SAS communication system design based on the parameters of the system and architecture.

In order to maximize $\Delta$, forward latency of the data FIFO element 1440 in the SAS receiver element 1420, $L_{fR}$, can be minimized, and/or the backward latency of the FIFO element 1430 in the SAS sender element 1410, $L_{bS}$, can be minimized. Any asynchronous FIFO known to those skilled in the art with small forward and backward latencies can be used in a SAS communication system design. For example, in some embodiments, a non-linear sender FIFO logic can be used within the sender controller and/or a non-linear receiver FIFO logic within the receiver controller 1420.

An additional timing constraint that can apply for an example can be that $n \times L_{bR} < n \times L_{bS} + 2 \times L_{SAS} + C_{ir}$. The additional timing constraint can insure that when coming out of a stalled state, the data waiting at the input of the SAS receiver element 1440 can latch the data before the data is acknowledged and removed from the input. Therefore, the wired channel 1460, the sender FIFO logic 1430, and the receiver FIFO logic 1440 are configured to operate within a start-up timing constraint that a backward latency of the receiver FIFO logic, $L_{bR}$, is less than a sum of a backward latency of the sender FIFO logic, $L_{bS}$, plus the response time $C_{ir}$ of the input channel, plus twice a channel latency, $L_{SAS}$, of the wired channel.

The SAS channel protocol and design elements provided can apply equally well to two phase or four phase signaling. Also, a SAS communication system can work equally well for bundled data or delay insensitive protocols. Likewise, the design can be automated due to the ability to define timing requirements and communication requirements and to characterize asynchronous FIFOs based on these requirements.

Any channel protocol, can be more or less concurrent, as known by those skilled in the art, which can be used to implement the FIFO elements and SAS communication channels and/or traditional channels. When $L_{SAS}$ becomes sufficiently large and signal fidelity can be sufficiently controlled, wave pipelining can be implemented with the SAS channel protocol provided where multiple transactions can be in flight down the SAS channel. The set of timing constraints described can be a representative set for an exemplary embodiment. Additional, fewer, or different timing constraints can be used depending on the embodiment.

Figure 15:
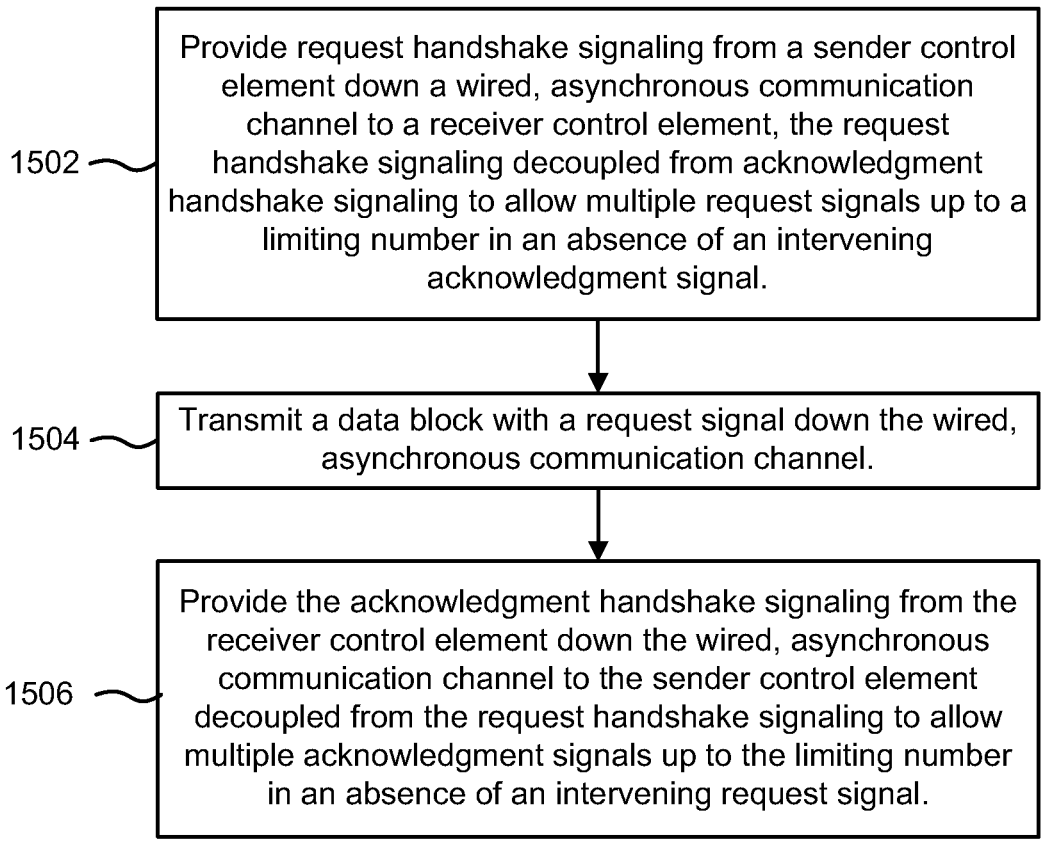
FIG. 15 illustrates a method for implementing a Source Asynchronous Signaling (SAS) protocol in accordance with an example.

FIG. 15 illustrates a method for implementing a SAS protocol. The SAS protocol can also be implemented as a method. One of many different examples of such a method can comprise providing 1502 request handshake signaling from a sender control element down a wired, asynchronous communication channel to a receiver control element. The request handshake signaling can be decoupled from acknowledgment handshake signaling to allow multiple request signals up to a limiting number in an absence of an intervening acknowledgment signal. Transmitting 1504 a data block can also be performed with a request signal down the wired, asynchronous communication channel. Such a method can also comprise providing 1506 the acknowledgment handshake signaling from the receiver control element down the wired, asynchronous communication channel to the sender control element. The acknowledgment signaling can be decoupled from the request handshake signaling to allow multiple acknowledgment signals up to the limiting number in an absence of an intervening request signal.

In an example, the method can be implemented with a single channel with FIFOs where an output channel request is unconnected in the sender FIFO connected to the input channel. In another example, the input channel acknowledgement is unconnected in the receiver FIFO connected to the output channel. In another configuration, the method includes timing inequalities that ensure that for FIFO channels which do not have the input or output connected, and a traditional channel protocol occurs on signals where request and acknowledge signals repeat.

Some examples involving a method can comprise operating the input channel coupled to the sender control element within a minimum input cycle time. The output channel coupled to the receiver control element can be operated within a minimum output cycle time. In such examples, the minimum input cycle time can be greater than the minimum output cycle time. The minimum output cycle time can be greater than both the maximum sender control element cycle time and the maximum receiver control element cycle time.

In some method examples, a linear FIFO element within the sender control element can be filled with a token for each request signal up to a number equal to a depth of the liner FIFO element. The filling can be accomplished within a time that is greater than or equal to a response time of the wired, asynchronous communication channel. The response time can be defined by Equation (22).

The method, device, and/or computer circuitry for asynchronous communication described herein include various benefits, such as specifying a channel protocol with acknowledgement signaling. The SAS channel can use one channel (including data, a request, and an acknowledgement) instead of two channels. The SAS channel protocol can define timing constraints to allow the SAS channel to operate correctly without stalling. The SAS channel device can use FIFOs without pipelined interface logic, which pipelined interface logic can result in a difference in the mathematical equations since using the pipelined interface logic can add an additional buffer depth to each of the end controllers. The SAS channel can use a single type of token instead of two types of tokens, such as a black token and white token. The SAS channel can use FIFO of the same size without defining a relation between FIFOs of a different size. Based on the various timing constraints described, using FIFOs of a different size for the sender logic and receiver logic can generate a penalty in die area, such as increasing the area and/or increasing a minimum FIFO size without a corresponding benefit.

In addition, the SAS channel protocol defines a channel protocol specification for a functional SAS channel and associated timing constraints for proper operation. The timing equations herein specify delays according to channels (e.g. $C_I$ and $C_O$) which include both controller and wire latency, instead of just controller latency. This allows one to avoid implementing interface controllers to the SAS channel. In addition, the primary purpose for the timing conditions is to maintain a correct handshake protocol of repeating request and acknowledgement events on the interfaces of the FIFOs that are not fully connected. As such, as the channel input delay $C_I$ increases to the point where no FIFOs are required, the SAS channel equations become identical to a traditional two cycle asynchronous communication channel. For example, the SAS channel protocol describes the process to pipeline signals down an asynchronous handshake channel with associated acknowledgements, timing constraints, and handshake signals. Understanding the timing relationships can 1be beneficial in generating timing conditions due to the timing constraints for a functional SAS channel device, e.g. reducing the backward latency of the sender FIFO 1430 and the forward latency of the receiver FIFO 1440 produce the design with smallest area and power. These FIFOs can use different logic and designs to optimize the associated paths. Changes in timing requirements (e.g., different mathematical timing requirements) can generate different implementations and different results. For instance, the inequality $C_I \geq C_O$ can be a requirement for correct operation.

The method, device, and/or computer circuitry for asynchronous communication described herein provides a formal model and formal verification (e.g., mathematical formulation) to efficiently design a SAS channel. The modeling described herein can be used to mathematically calculate the size of the FIFOs based on the input channel cycle time, the design of the FIFOs, and latency down a channel. The SAS channel modeling can generate bounds and results on FIFOs meeting the requirements, such as timing constraints. For example, general linear FIFOs in some instances can result in an inoperable SAS channel.

Moreover, the SAS channel protocol and design can be an improvement over traditional pipelined approaches in terms of power (e.g., reduced power), performance (e.g., improved signaling speed), and area (e.g., a reduced die footprint). FIG. 7 illustrates some of the improvements of using the SAS channel. The SAS channel protocol and design described herein can be used to determine the frequencies and wire lengths where SAS FIFOs can be beneficial, and can be used to determine the tradeoffs between frequencies and channel latencies for various SAS FIFOs.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device for asynchronous communication, comprising:
a wired channel having a sender end and a receiver end and including a request wire and an acknowledge wire for asynchronous flow control for transmission of data blocks on a set of data wires;
a sender controller coupled to an input channel and coupled to the acknowledge wire of the wired channel at the sender end, wherein the input channel includes an input request port and an input acknowledge port used to acknowledge received data blocks, wherein the sender controller is configured to send to the input channel a plurality of acknowledgment signals, indicating reception of a plurality of data blocks, up to a predefined limit in an absence of an intervening acknowledge signal received on the wired channel; and
a receiver controller coupled to the request wire and the data wires of the wired channel at the receiver end and coupled to an output channel configured to transmit, from output data ports, the data blocks controlled by an output request port and an output acknowledge port, wherein the receiver controller is configured to receive multiple request signals up to the predefined limit on the request wire of the wired channel at the receiver end before receiving an acknowledgment signal on the output acknowledge port, wherein each request signal is paired with a data block sent on the data wire of the wired channel at the receiver end, and a combination of the input channel, the sender controller, the receiver controller, or the output channel that are configured to operate within at least one time constraint to avoid stalling an asynchronous flow control.

2. The device of claim 1, wherein the sender controller further comprises:
sender First Input, First Output (FIFO) logic of a depth equal to the predefined limit, wherein the FIFO logic is configured to:
monitor a difference between a number of requests received on the input request port relative to a number of acknowledgements received on the acknowledge wire of the wired channel at the sender end, wherein the number of requests represents a number of data transfers, and the number of acknowledgements represents a number of completed data transactions; and
limit the number of acknowledgements sent on the input acknowledge port to ensure that the difference does not exceed a value equal to the predefined limit.

3. The device of claim 2, wherein:
the input channel of the sender controller further comprises an input data port, wherein the input data port is coupled to the data wires of the wired channel at the sender end; and
the input request port is coupled to the request wire of the wired channel at the sender end; and
the request output of the FIFO output port is unconnected.

4. The device of claim 2, wherein the at least one time constraint includes a minimum output cycle time of the output channel is greater than or equal to a maximum sender-FIFO cycle time of the sender FIFO logic.

5. The device of claim 2, wherein the at least one time constraint includes one cycle time more than a filling time to fill the sender FIFO logic with a number of tokens equal to a number of requests on the input request port that is equal to the predefined limit and is greater than or equal to a response time, wherein the response time is a time for a single token to pass through the device until the device is idle, wherein the response time is equal to a time between a reception of a first data block on an input data port of the input channel and an emptying of the sender FIFO logic and a receiver FIFO logic within the receiver controller and the wired channel that is idle, wherein each token represents data or control signaling for each data block.

6. The device of claim 1, wherein the receiver controller further comprises:
receiver First Input, First Output (FIFO) logic of a depth equal to the predefined limit, wherein the receiver FIFO logic is configured to:
buffer a set of data blocks received over the set of data wires of the wired channel up to the predefined limit; and
limit a transmission of the set of data blocks on the output data port, in an order received, to one data transmission per acknowledgment received from the output acknowledge port until the buffer is emptied.

7. The device of claim 6, wherein the output acknowledge port of the output channel is coupled to the acknowledge wire of the wired channel at the receiver end and an acknowledge port on a FIFO input is not connected.

8. The device of claim 6, wherein the receiver FIFO logic and the input channel are configured to operate within an acknowledge-transition timing constraint where the acknowledgment on the wired channel acknowledge port does not occur until after the corresponding request signal on the unconnected receiver FIFO request port.

9. The device of claim 6, wherein the sender FIFO logic and the output channel are configured to operate within a request-transition timing constraint where the request on the wired channel request port does not occur before a next acknowledge signal on an unconnected sender FIFO acknowledge port, the at least one time constraint includes a minimum input cycle time of the input channel that is greater than or equal to a maximum receiver-FIFO cycle time of the receiver FIFO logic.

10. The device of claim 6, wherein the sender controller further comprises:
sender First Input, First Output (FIFO) logic of a depth equal the predefined limit, wherein the at least one time constraint includes a minimum input cycle time of the input channel that is greater than or equal to a minimum output cycle time of the output channel, and the minimum output cycle time that is both greater than or equal to a maximum sender-FIFO cycle time of the sender FIFO logic and a maximum receiver-FIFO cycle time of the receiver FIFO logic.

11. The device of claim 6, wherein the at least one time constraint includes a precondition timing constraint that a minimum input cycle time of the input channel is greater than a sum of a forward latency of the receiver FIFO logic and a backward latency of a sender FIFO logic within the sender controller.

12. The device of claim 6, wherein a sender FIFO logic in the sender controller and the receiver FIFO logic in the receiver controller are configured with a common depth that is greater than or equal to a first value divided by a second value, wherein:
the first value equals twice a channel latency time of the wired channel plus a minimum output channel response time minus the minimum cycle time of the input channel; and
the second value equals the minimum input cycle time of the input channel less a sum, and the sum is equal to an average backward latency per stage of the sender FIFO logic within the sender controller and an average forward latency per stage of the receiver FIFO logic within the receiver controller.

13. The device of claim 6, wherein the at least one time constraint includes a stalled channel start-up timing constraint wherein a backward latency of the receiver FIFO logic is less than a sum of a backward latency of a sender FIFO logic in the sender controller plus twice a channel latency of the wired channel plus the input channel response time to an acknowledge signal.

14. The device of claim 1, wherein the at least one time constraint includes a minimum input cycle time of the input channel that is greater than or equal to a minimum output cycle time of the output channel.

15. A method for asynchronous handshake communication, comprising:
providing request handshake signaling from a sender control element on a wired, asynchronous communication channel to a receiver control element, the request handshake signaling decoupled from acknowledgment handshake signaling to allow multiple request signals to be sent, up to a limited number of request signals, in an absence of an intervening acknowledgment signal;
transmitting a data block corresponding with a request signal on the wired, asynchronous communication channel; and
providing the acknowledgment handshake signaling from the receiver control element on the wired, asynchronous communication channel to the sender control element decoupled from the request handshake signaling to allow multiple acknowledgment signals up to the limiting number in an absence of an intervening request signal.

16. The method of claim 15, further comprising operating:
an input channel coupled to the sender control element within a minimum input cycle time;
an output channel coupled to the receiver control element within a minimum output cycle time;
the sender control element within a maximum sender cycle time; or
the receiver control element within a maximum receiver cycle time, wherein the minimum input cycle time is greater than or equal to the minimum output cycle time and the minimum output cycle time is greater than or equal to both the maximum sender cycle time and the maximum receiver cycle time.

17. The method of claim 15, further comprising filling a First Input, First Output (FIFO) element within the sender control element with a token for each request signal up to a number equal to a depth of the FIFO element plus one additional minimum input channel cycle time within a time that is greater than or equal to a response time of a round trip of the request signal and corresponding acknowledgement signal on the wired, asynchronous communication channel, wherein each token represents data or control signaling for each data block.

18. The method of claim 17, wherein the response time of the wired, asynchronous communication channel is substantially equal to twice a channel latency time of the wired, asynchronous communication channel plus a backward latency of a sender control FIFO element within the sender control element plus a forward latency of a receiver control FIFO element within the receiver control element plus a output channel response time of an output channel coupled to the receiver control element.

19. At least one non-transitory machine readable storage medium comprising a plurality of instructions adapted to be executed to implement the method of claim 15.

20. An asynchronous communication channel having computer circuitry configured to:
interface an input channel operating with a control-flow handshake protocol with an alternating request-acknowledgment pattern between requests and acknowledgments on an input request wire and an input acknowledge wire, via a sender element, with a Source Asynchronous Signaling (SAS) channel capable of transmitting multiple requests on a request wire without acknowledgment and simultaneously multiple acknowledgments on a acknowledge wire within the SAS channel without intervening requests; and
interface the SAS channel with an output channel operating with a control-flow handshake protocol with an alternating request acknowledgment pattern over an output request wire and an output acknowledge wire.

21. The computer circuitry of claim 20, further comprising:
a receiver element coupled to the output channel to store a number of data blocks sent from the sender element without an intervening acknowledgment from the output channel, wherein the sender element accepts a number of acknowledgments sent from the receiver up to a predetermined limit without an intervening request from the input channel.

22. The computer circuitry of claim 21, wherein the receiver element is configured to implement an n-deep FIFO control-flow element, the n-deep FIFO control-flow element configured to:
store data blocks provided on a SAS set of data wires within the SAS channel up to the predetermined limit within an n-deep FIFO storage element, wherein a stage in the n-deep FIFO storage element for storing a data block is communicatively coupled to a control stage in the n-deep FIFO control-flow element; and
place a data block on an output set of data wires within the output channel in response to each acknowledgment received at the n-deep FIFO control-flow element from the output channel until the n-deep FIFO storage element is emptied and no data blocks remain on the SAS set of data wires within SAS channel.

23. The computer circuitry of claim 21, wherein the receiver element is configured to implement an n-deep FIFO control-flow element, the n-deep FIFO control-flow element configured to:
store a second number of tokens, each token corresponding to a request asserted on the SAS channel, up to the predetermined limit, each token resulting in a request on the output channel that is followed by an acknowledgment received at the n-deep FIFO control-flow element from the output channel, wherein the input acknowledge of the FIFO remains unconnected, and
the acknowledgment received at the output of the n-deep FIFO control-flow element also being communicated to bypass the n-deep FIFO control-flow element to propagate directly over the SAS channel to allow a number of acknowledgments up to the predetermined limit to be transmitted over the SAS channel without an intervening request on the SAS channel.

24. The computer circuitry of claim 21, further comprising an element configured to operate the input channel within a minimum input cycle time, the output channel within a minimum output cycle time, the n-deep FIFO element within a maximum sender-FIFO cycle time, or the n-deep FIFO control-flow element within a maximum receiver-FIFO cycle time, such that the minimum output cycle time is less than or equal to the minimum input cycle time and both the maximum sender-FIFO cycle time and the maximum receiver-FIFO cycle time are less than or equal to the minimum output cycle time, wherein the element is selected from the group consisting of an input control element within the input channel, an output control element within the output channel, an n-deep FIFO element in the sender element, and an n-deep FIFO control-flow element in the receiver element.

25. The computer circuitry of claim 21, further comprising at least one element configured to operate such that a time to fill the n-deep FIFO element in the sender element with a number of tokens equal to the predetermined limit plus a minimum cycle time of the input channel is greater than or equal to a SAS channel response time, and the response time of the SAS system being equal to twice a SAS channel latency time plus a backward latency time of the n-deep FIFO element within the sender element plus a forward latency time of the n-deep FIFO control-flow element within the receiver element plus a minimum output channel response time of the output channel, wherein the element is selected from the group consisting of an input control element within the input channel, an output control element within the output channel, an n-deep FIFO element in the sender element, and an n-deep FIFO control-flow element in the receiver element.

26. The computer circuitry of claim 21, further comprising computer circuitry to implement a number of control stages in:

The n-deep FIFO element in the sender element; or

The n-deep FIFO control-flow element in the receiver element, wherein the number of control stages is greater than or equal to a first value divided by a second value, wherein:

the first value equals twice a SAS channel latency time plus a minimum response time of the output channel minus the minimum input cycle time of the input channel;

the second value equals a minimum input cycle time of the input channel less a sum, the sum equals an average backward latency per stage time of the n-deep FIFO element within the sender element plus an average forward latency per stage of the n-deep FIFO control-flow element within the receiver element; and a minimum input cycle time of the input channel is greater than a sum of an average forward latency per stage time of the n-deep FIFO in the receiver element and an average backward latency per stage time of the n-deep FIFO element in the sender element.

27. The computer circuitry of claim 21, further comprising computer circuitry in:

the n-deep FIFO element in the sender element; or the n-deep FIFO control-flow element in the receiver element configured to ensure that a backward latency time of the n-deep FIFO control-flow element in the receiver control element is less than a sum of a backward latency of the n-deep FIFO element within the sender element plus twice a SAS channel latency plus the response time of the input channel.

28. The computer circuitry of claim 20, further comprising circuitry to implement at least one timing constraint between the input channel, the output channel, the sender element, or the receiver element.

29. The computer circuitry of claim 20, wherein the sender element is configured to implement an n-deep FIFO element, the n-deep FIFO element configured to:

place a token in the n-deep FIFO element for each request on the input channel until a number of tokens in the n-deep FIFO element equals a depth of the n-deep FIFO element;

reduce the number of tokens for each acknowledgment from the SAS channel until the number of tokens equals zero;

provide an acknowledgment on the input channel in response to a request from the input channel unless the number of tokens placed in the n-deep FIFO element equals the depth.

* * * * *